(12) United States Patent
McKenney

(10) Patent No.: US 9,910,907 B2
(45) Date of Patent: *Mar. 6, 2018

(54) ATOMICALLY MOVING DATA ELEMENTS BETWEEN OR WITHIN LINKED DATA STRUCTURES

(71) Applicant: International Business Machines Corporation, Armonk, NY (US)

(72) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 466 days.

This patent is subject to a terminal disclaimer.

(21) Appl. No.: 14/608,469

(22) Filed: Jan. 29, 2015

(65) Prior Publication Data

US 2016/0224608 A1   Aug. 4, 2016

(51) Int. Cl.
*G06F 17/30* (2006.01)

(52) U.S. Cl.
CPC .. *G06F 17/30595* (2013.01); *G06F 17/30359* (2013.01); *G06F 17/30371* (2013.01)

(58) Field of Classification Search
CPC .................................................. G06F 17/30359
See application file for complete search history.

(56) References Cited

U.S. PATENT DOCUMENTS

| | | |
|---|---|---|
| 5,442,758 A | 8/1995 | Slingwine et al. |
| 5,608,893 A | 3/1997 | Slingwine et al. |
| 5,727,209 A | 3/1998 | Slingwine et al. |
| 6,219,690 B1 | 4/2001 | Slingwine et al. |
| 6,662,184 B1 | 12/2003 | Friedberg |
| 7,349,926 B2 | 3/2008 | McKenney et al. |

(Continued)

OTHER PUBLICATIONS

Cederman, "Concurrent Algorithms and Data Structures for Many-Core Processors", Doktorsavhandlingar vid Chalmers tekniska högskola, Ny serie nr 3184, ISSN 0346-718X, 2011, 168 pages, Chalmers Reproservice, http://www.cse.chalmers.se/~cederman/thesis.pdf.

(Continued)

*Primary Examiner* — Apu Mofiz
*Assistant Examiner* — Dara J Glasser
(74) *Attorney, Agent, or Firm* — Walter W. Duft

(57) ABSTRACT

A data element of a linked data structure is atomically moved without delaying lockless readers. A status-indicating entity is allocated, associated with the data element, and indicates validity of the data element with respect to the first linked data structure. A copy element, or a pointer thereto, is created from the data element. The status-indicating entity is associated with the copy element and indicates no validity of the copy element with respect to a second linked data structure. The copy element is linked to the second linked data structure. The status-indicating entity is atomically updated to indicate no validity of the data element with respect to the first linked data structure and validity of the copy element with respect to the second linked data structure. The data element is deleted and the status-indicating entity is disassociated from the copy element. Both structures may be deallocated in a deferred reader-friendly manner.

13 Claims, 15 Drawing Sheets

(56) References Cited

U.S. PATENT DOCUMENTS

| | | | |
|---|---|---|---|
| 7,536,507 B1* | 5/2009 | Wagner | G06F 3/0619 711/114 |
| 7,668,851 B2 | 2/2010 | Triplett | |
| 7,873,612 B2 | 1/2011 | McKenney et al. | |
| 7,987,166 B2 | 7/2011 | McKenney et al. | |
| 8,661,005 B2 | 2/2014 | McKenney et al. | |
| 8,788,543 B2 | 7/2014 | McKenney et al. | |
| 2004/0148463 A1* | 7/2004 | Brown | G06F 9/52 711/118 |
| 2011/0137962 A1 | 6/2011 | McKenney et al. | |
| 2012/0303908 A1* | 11/2012 | Dantzig | G06F 12/0842 711/145 |
| 2014/0025709 A1 | 1/2014 | Haghighat et al. | |

OTHER PUBLICATIONS

Cederman et al., "Supporting Lock-Free Composition of Concurrent Data Objects: Moving Data between Containers", 2012, pp. 1-14, Chalmers University of Technology, Sweden, http://www.cse.chalmers.se ~tsigas/papers/Lock-Free-Moving-TC.pdf.

Clements et al., "Scalable Address Spaces Using Rcu Balanced Trees", Architectural Support for Programming Languages and Operating Systems (ASPLOS 2012), pp. 199-210, London, UK, Mar. 2012. ACM.

Desnoyers et al., "User-level implementations of read-copy update", IEEE Transactions on Parallel and Distributed Systems, 23:375-382, 2012.

Gramoli et al., "Democratizing transactional programming", Commun. ACM, 57(1):86-93, Jan. 2014.

Howard et al., "A relativistic enhancement to software transactional memory", Proceedings of the 3rd USENIX conference on Hot topics in parallelism, HotPar'11, pp. 1-6, Berkeley, CA, USA, 2011. USENIX Association.

Howard et al., "Relativistic red-black trees", Concurrency and Computation: Practice and Experience, 12 pages, 2013.

Kung et al., "Concurrent manipulation of binary search trees", ACM Transactions on Database Systems, 5(3):354-382, Sep. 1980.

Manber et al., "Concurrency control in a dynamic search structure", ACM Transactions on Database Systems, 9 (3):439-455, Sep. 1984.

McKenney, "Structured deferral: synchronization via procrastination", Commun. ACM, 56(7):40-49, Jul. 2013.

McKenney et al., "Read-copy update: Using execution history to solve concurrency problems", Parallel and Distributed Computing and Systems, pp. 509-518, Las Vegas, NV, Oct. 1998.

McKenney et al., "What is RCU, fundamentally?"<http://lwn.net/Articles/262464/>, 13 pages, Dec. 27, 2007.

Piggen, "[patch 3/3] radix-tree: RCU lockless readside", <http://lkml.org/lkml/2006/6/20/238>, 8 pages, Jun. 2006.

Pugh, "Concurrent maintenance of skip lists", Technical Report CS—TR-2222.1, 14 pages, Institute of Advanced Computer Science Studies, Department of Computer Science, University of Maryland, College Park, Maryland, Jun. 1990.

Triplett et al., "Scalable concurrent hash tables via relativistic programming", ACM Operating Systems Review, 44(3), pp. 102-109, Jul. 2010.

Triplett et al., "Resizable, scalable, concurrent hash tables via relativistic programming", Proceedings of the 2011 USENIX Annual Technical Conference, pp. 145-158, Portland, OR USA, Jun. 2011. The USENIX Association.

International Business Machines Corporation, "List of IBM Patents or Patent Applications Treated as Related", Oct. 15, 2015, 2 pages.

* cited by examiner (Initial State)

(Operation 2)

(Operation 4)

(Operation 6)

(Operation 208)

(Operation 210)

(Operation 212)

(Operation 214)

ATOMICALLY MOVING DATA ELEMENTS BETWEEN OR WITHIN LINKED DATA STRUCTURES

BACKGROUND

1. Field

The present disclosure relates to linked data structures. More particularly, the disclosure concerns moving elements between linked data structures concurrently with data read operations.

2. Description of the Prior Art

By way of background, linked data structures, such as search trees, linked lists, etc., have been proposed that allow data updates to be performed concurrently with lockless data read-side operations. However, non-transactional-memory-based algorithms are lacking that can atomically move a data element from one linked data structure to another without delaying lockless readers.

SUMMARY

A method, system and computer program product are provided for atomically moving a data element of a linked data structure without delaying lockless readers that reference the data element. According to example embodiments, a status-indicating entity is allocated if it does not already exist and associated with a data element that is linked to a first linked data structure. The status-indicating entity indicates that the data element has validity with respect to the first linked data structure. The data element, or a pointer thereto, is copied to create a copy element that is to be linked to a second linked data structure. The status-indicating entity is associated with the copy element, and indicates that the copy element has no validity with respect to the second linked data structure. The copy element is linked to the second linked data structure. The status-indicating entity is atomically updated to indicate that the data element has no validity with respect to the first linked data structure and the copy element has validity with respect to the second linked data structure. The data element is deleted from the first linked data structure and deallocated in a deferred manner that guarantees none of the lockless readers will be referencing it at the time of deallocation. The status-indicating entity is disassociated from the copy element and, if no longer needed, is deallocated in a deferred manner that guarantees none of the lockless readers will be referencing it at the time of deallocation.

BRIEF DESCRIPTION OF THE DRAWINGS

The foregoing and other features and advantages will be apparent from the following more particular description of example embodiments, as illustrated in the accompanying Drawings.

FIG. 1 is a flow diagram showing an example embodiment for atomically moving a data element of a linked data structure using an allegiance structure.

DETAILED DESCRIPTION OF EXAMPLE EMBODIMENTS

Figure 1:
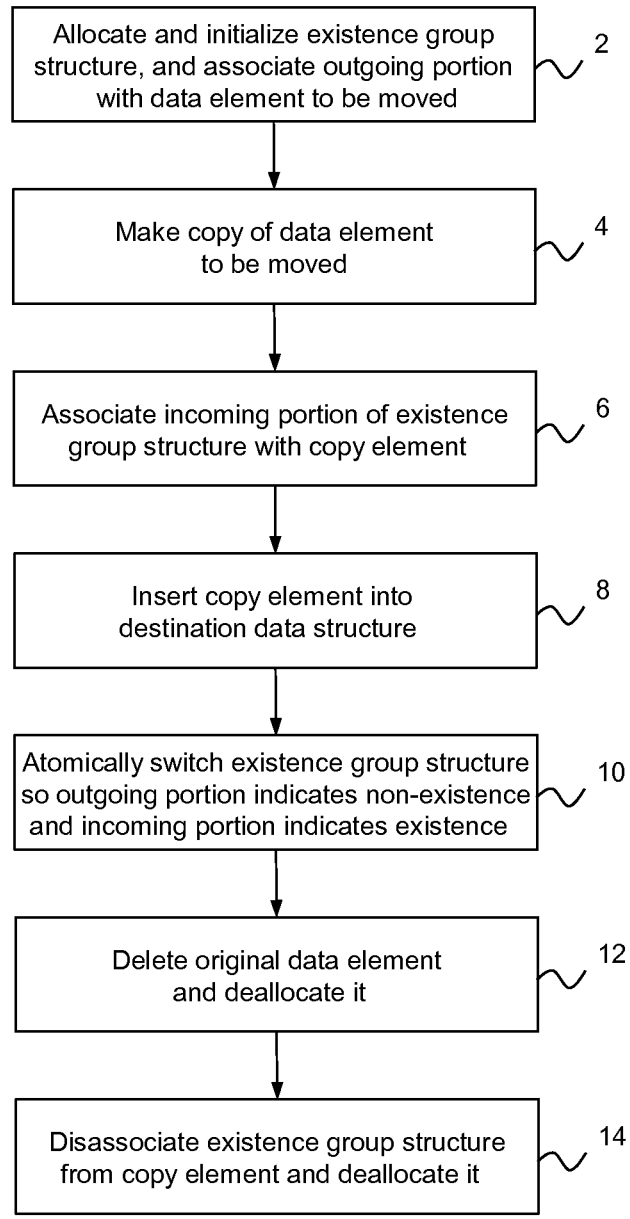
FIG. 1 is a flow diagram showing an example embodiment for atomically moving a data element of a linked data structure using an existence group structure.

Example embodiments will now be described for atomically moving data elements between or within linked data structures, such as search trees, linked lists, etc., without delaying lockless readers. In the ensuing discussion, the term data structure will sometimes be used as a shorthand for linked data structure, and both terms will thus be understood to signify the same thing, namely a data structure whose elements are linked together and traversed in an elementby-element manner, such as from a root node element to a leaf-node element, or from a head element to a tail element, etc.

Each of the disclosed embodiments provides the following features and advantages:

(1) Concurrent move operations involving the same data elements that are not near to each other in either the source or destination data structure will proceed without contention.

(2) A reader that sees the data element in its destination data structure will fail to find it during any subsequent search of the source data structure.

(3) A reader that fails to find the data element in the source data structure will find it in any subsequent search of the destination data structure.

(4) A given move operation will proceed without contention, even given concurrent insertions, deletions, or other linked data structure modifications, as long as these other operations are not near the move operation in either the source or the destination data structure.

(5) A given move operation will proceed without contention, even given concurrent relaxed search operations, even if the search operations are looking for the element being moved.

(6) A given move operation will proceed without contention, even given concurrent non-relaxed search operations, but only when the search operations are not near the move operation in either the source or the destination data structure.

Advantageously, the disclosed technique can easily be generalized to cover moving multiple data elements, and also to multiple types of data structures, including atomically moving an element from one type of linked data structure to another. For example, the disclosed approach can be used to atomically move a data element from a search tree to a linked list. Initial embodiments disclosed herein utilize the concept of data element existence, while subsequent embodiments utilize the concept of data element allegiance. Both concepts serve to indicate the validity status of a data element with respect to a linked data structure to which it is linked. The validity status of a data element indicates whether or not the data element is a valid member of its linked data structure.

Data Element Existence

The notion of data element existence allows a given data element to physically reside in two data structures at once, but logically be part of only some subset of them. Then if the element's existence can be altered atomically, it will be seen to move atomically from one enclosing data structure to another. Properly aligned machine-word-sized scalar variables can be written atomically on most modern systems, where "atomically" in this case means that concurrent reads of the location being written will see either the old value or the new value, but not a "mash-up" of the two values. This allows a single store instruction to atomically switch a given data element's existence in multiple data structures, for example, enabling an atomic move from one data structure to another.

Using the existence concept, an atomic move of a data element from a source data structure to a destination data structure may be carried out using the operations illustrated in FIG. 1.

In a first operation 2 of FIG. 1, an existence group structure is allocated if it does not already exist. The existence group structure, whether newly allocated or previously in existence, is initialized to contain an existence structure that initially indicates existence but will be switched to indicate non-existence (the outgoing existence structure) and another existence structure that initially indicates non-existence but will be switched to indicate existence (the incoming existence structure). The outgoing existence structure is associated with the data element to be moved. Because the outgoing existence structure was initialized to indicate existence, the existence group structure indicates that the data element is a valid member of its current data structure, representing the source data structure. As described in more detail below, the association may be defined by providing the data element with an "existence pointer" that references the outgoing existence structure.

In a second operation 4 of FIG. 1, a copy is made of the data element to be moved. In cases where the data element cannot be copied, a level of indirection may be introduced. This allows a pointer to the data element to be copied, thus allowing external pointers to that data element to be maintained throughout the atomic move operation.

In a third operation 6 of FIG. 1, the incoming existence structure allocated in operation 2 is associated with the copy element. As described in more detail below, the association may be defined by providing the copy element with an "existence pointer" that references the incoming existence structure.

In a fourth operation 8 of FIG. 1, the copy element is inserted into the destination data structure. Because the copy element is associated with the incoming existence structure, and because the incoming existence structure was initialized to indicate non-existence, the existence group structure indicates that the copy element is not a valid member of the designation data structure. Any search for the copy element in the destination data structure will fail.

In a fifth operation 10 of FIG. 1, the existence group structure is atomically switched so that the outgoing existence structure now indicates non-existence and the incoming existence structure indicates existence. At this point, the existence group structure indicates that the original data element is no longer a valid member of the source data structure, and searches for the original data element in the source data structure will start failing. Meanwhile, the existence group structure indicates that the copy data element is now a valid member of the destination data structure, and searches for the copy element in the destination data structure will start succeeding.

In a sixth operation 12 of FIG. 1, the original data element is deleted from the source data structure and deallocated (preferably after a grace period as described below).

In a seventh operation 14 of FIG. 1, the incoming existence structure is disassociated from the copy element. The existence group structure is then deallocated if it is no longer needed (preferably after a grace period as described below).

The foregoing operations of FIG. 1 are illustrated graphically in FIGS. 2A-2H.

Figure 2A:
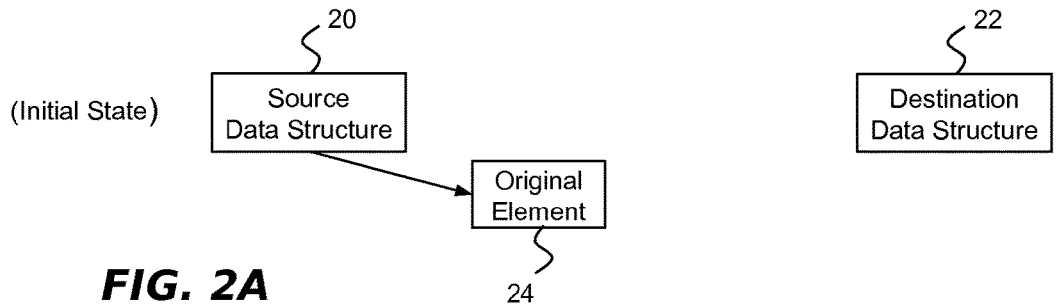
FIGS. 2A-2H are diagrammatic representations corresponding to the operations shown in the flow diagram of FIG. 1 using an existence group structure.

FIG. 2A shows an initial state in which there is a source data structure 20, a destination data structure 22, and an original data element 24 that is to be atomically moved from the source data structure to the destination data structure.

Figure 2B:
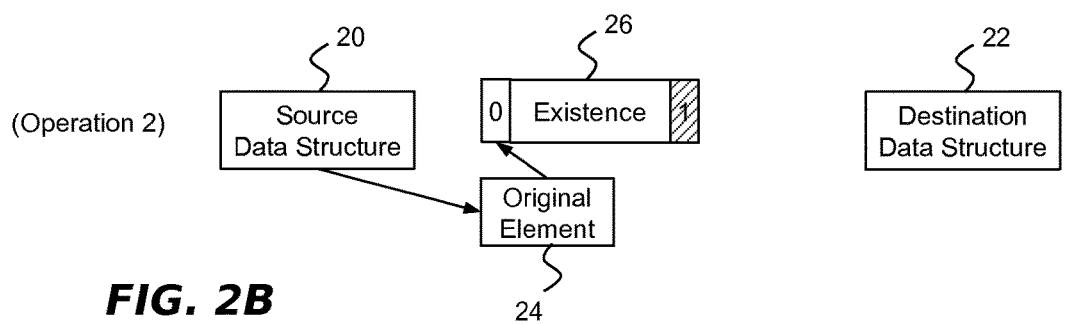

Per operation 2 above, FIG. 2B shows the allocation of an existence group structure 26, which is then initialized to contain an outgoing existence structure "0" that will be switched from existing to nonexisting, and an incoming existence structure "1" that will be switched from nonexisting to existing. The incoming existence structure 1 is cross-hatched to indicate that its state indicates non-existence. The outgoing existence structure 0 is not cross-hatched to indicate that its state indicates existence. The outgoing existence structure 0 (whose state indicates existence) is associated with the original data element 24.

Figure 2C:
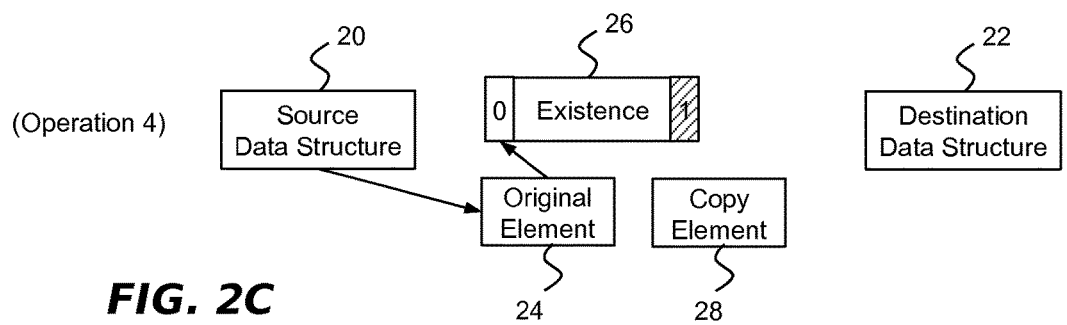

Per operation 4 above, FIG. 2C shows a copy 28 of the original element 24 to be moved.

Figure 2D:
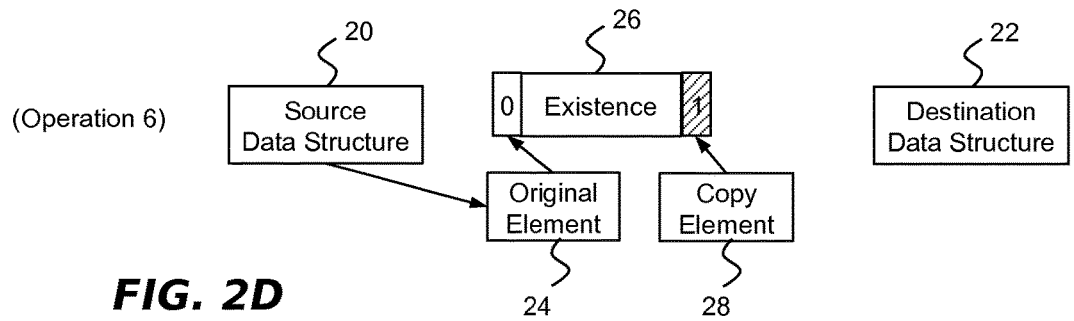

Per operation 6 above, FIG. 2D shows the incoming existence structure 1 being associated with the copy element 28.

Figure 2E:
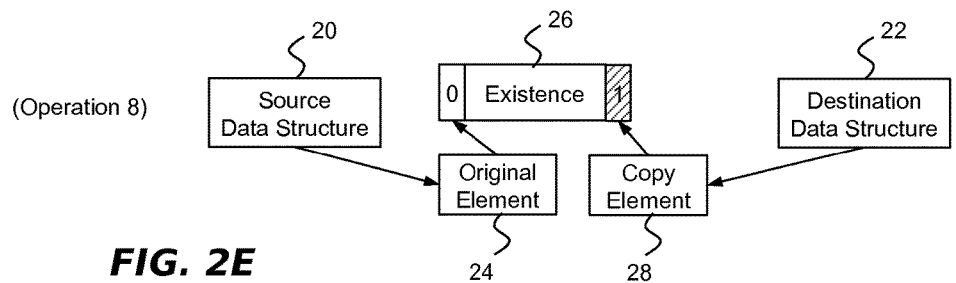

Per operation 8 above, FIG. 2E shows the copy element 28 being inserted into the destination data structure 22.

Figure 2F:
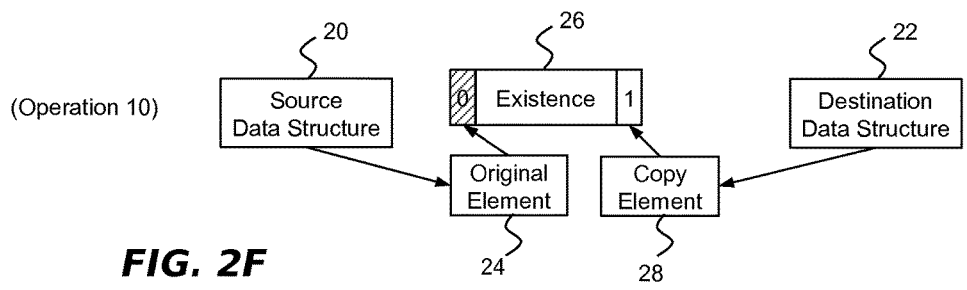

Per operation 10 above, FIG. 2F shows the existence group structure 26 being atomically switched so that the outgoing existence structure 0 (which associated with the original data element 24 and shown without cross-hatching) indicates non-existence and the incoming existence structure 1 (which is associated with the copy element 28 and shown with cross-hatching) indicates existence.

Figure 2G:
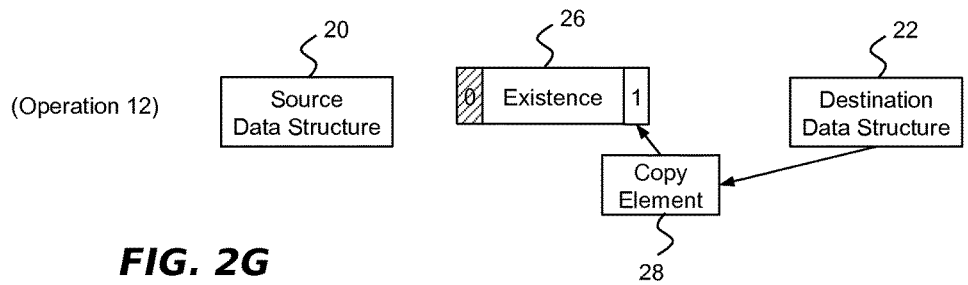

Per operation 12 above, FIG. 2G shows the original data element 24 having been deleted from the source data structure 20 and deallocated.

Figure 2H:
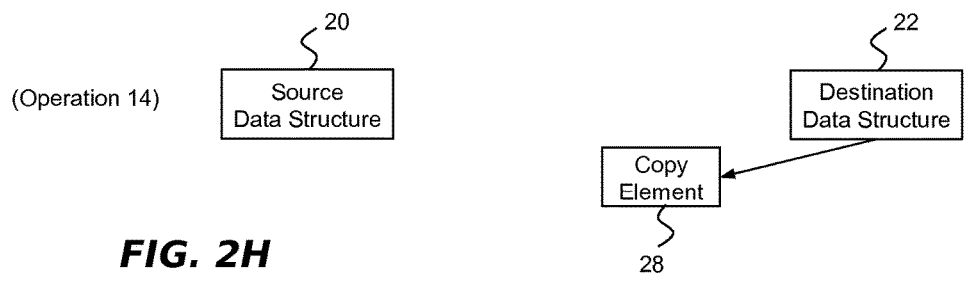

Per operation 14 above, FIG. 2H shows the incoming existence structure 1 having been disassociated from the copy element 28 and the existence group structure 26 having been deallocated.

In some embodiments, an existence structure may be permanently associated with each data element, in which case move-time allocation and deallocation is unnecessary. However, performing move-time allocation and deallocation allows for more efficient existence checking in the common case where a given element is not being moved.

Other embodiments introduce the restriction that a given data element can only be part of one particular linked data structure. In this "in-or-out" scenario, this data element is either in the data structure or out of it, but if the data element is in, the identity of the data structure that it is a member of is implicit in the linkage from that data structure to this particular data element. This restriction allows complex multi-element atomic operations to be set up more simply. It also allows a given data element to be moved (via either copying or indirection) from one place to another within the same data structure. As described below, it also permits a solution to the "bank transfer" problem.

Note that the deallocation of the original data element and existence group structure should be deferred to avoid disrupting concurrent lockless readers. This deferral may be carried out via any convenient deferred-destruction mechanism, including garbage collectors, reference counters, hazard pointers, or Read-Copy Update (RCU). Embodiments disclosed herein use RCU. The selected mechanism should guarantee no lockless reader will be referencing the original data element or the existence group structure when these entities are deallocated.

Different types of existence implementations may be used. One type may be used when all data elements to be moved have the same source data structure and the same destination data structure. Another type may be used when the data elements are to move among several different data structures. The second implementation is also suited for bidirectional atomic movement between a pair of data structures.

Figure 3:
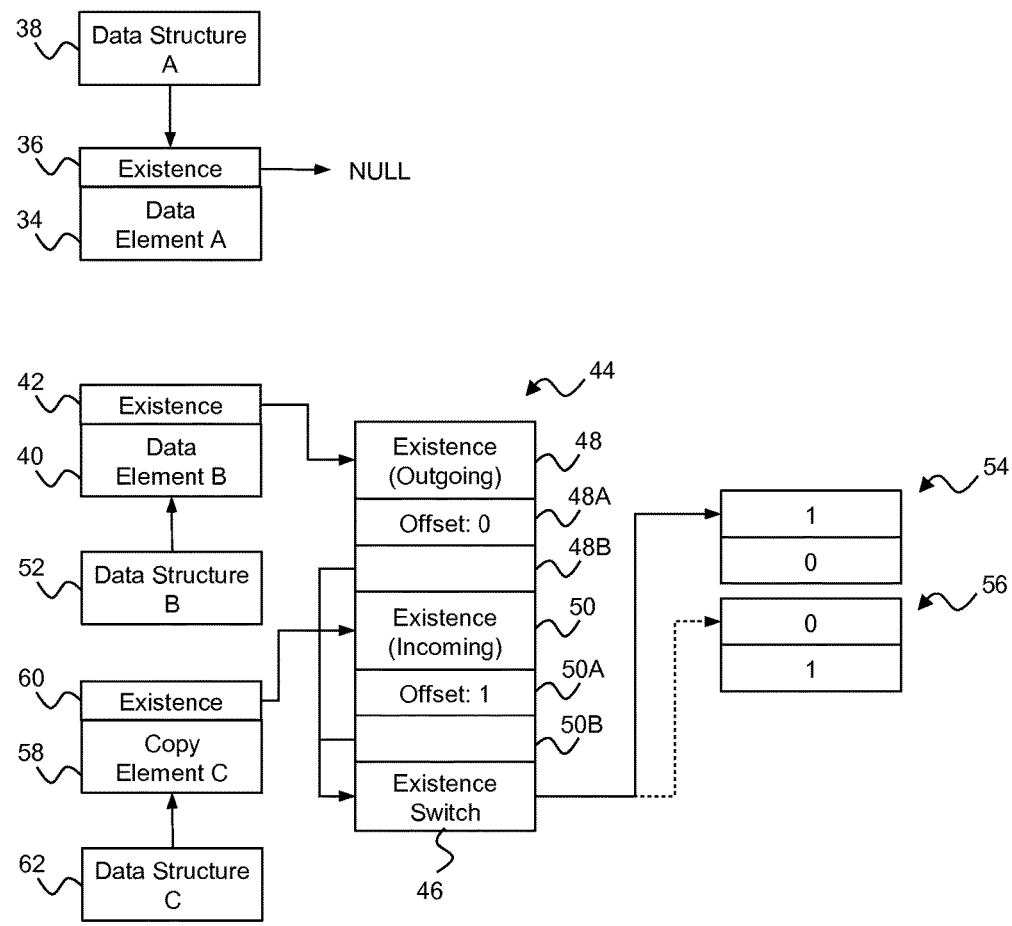
FIG. 3 is a functional block diagram showing an example implementation of the existence group structure of FIGS. 1 and 2A-2H being used to indicate the status of various data elements belonging to various linked data structures.

In the same-source/same-destination case, a data element's existence can take one of two forms. The first form of the same-source/same-destination case is used when a data element is not moving, and is exemplified by data element 34 (Data Element A) in FIG. 3. This form is implemented by providing Data Element A with a NULL existence pointer 36 to indicate the data element is a member of the data structure that would be expected based on the path taken to it. In FIG. 3, this is the data structure 38 (Data Structure A).

The second form of the same-source/same-destination case is used to atomically move elements, and is exemplified by data element 40 (Data Element B) in FIG. 3. Here, Data Element B's existence pointer 42 references an existence group structure 44, which contains a location 46 (called "Existence Switch") that can be overwritten in order to atomically switch the existence of a group of data elements. This implementation fits into the atomic-move conceptual procedure described in connection with FIG. 1. The existence switch 46 performs the existence group structure switching operation. The outgoing existence structure 0 and the incoming existence structure 1 of FIGS. 2A-2H are respectively shown by reference numbers 48 and 50 in FIG. 3.

Here one can see the significance of using the labels "0" and "1" for the outgoing and incoming existence structures of FIGS. 2A-2H. In FIG. 3, the outgoing existence structure 48 has an offset field 48A that is shown to be set to an offset: 0 value, and the incoming existence structure 50 has an offset field 50A that is shown to be set to an offset: 1 value. The offset value stored in the offset fields 48A and 50A corresponds to the element number of a pair of first and second existence arrays 54 and 56 on the right-hand side of the FIG. 3. Thus, the offset: 0 value stored in the offset field 48A of the outgoing structure 48 refers to the first element of each existence array 54 and 56. Similarly, the offset: 1 value stored in the offset field 50A of the incoming existence structure 50 refers to the second element of the existence arrays 54 and 56. Note that an alternative name for the existence structures 48 and 50 would be "existence/offset structures." An alternative name for the existence arrays 54 and 56 would be "existence state arrays," since they indicate existence state as will now be described. It will be appreciated that although the existence arrays 54 and 56 are depicted as separate data structures, they could also be implemented at different locations within a single large array.

The values stored in each array element of existence arrays 54 and 56 represent existence indicators that indicate a state of existence vs. non-existence for any data element whose existence pointer references either the outgoing existence structure 48 or the incoming existence structure 50. By way of example, an array element value of "1" may indicate existence and a value of "0" may indicate non-existence. The term "existence" as used herein means that the data element "exists" as valid member of the data structure to which it is linked. As an alternative to asserting that the data element "exists" in that data structure, one could use other descriptive terminology, such as the data element having "allegiance" to the data structure, or having "validity" with respect to the data structure. No matter what terminology is used, the underlying concept is that any reader encountering a data element during a search of a linked data structure will be able to ascertain the data element's status relative to the data structure, and thereby know whether to accept the data element as valid or ignore it. It will thus be appreciated that the existence group structure 44 (together with the first and second existence arrays 54 and 56) functions as a type of status-indicating entity for the data element that reference them. The existence group structure 44 and the existence arrays 54 and 56 represent an embodiment of the existence group structure 26 of FIGS. 2A-2H, which is likewise an embodiment of a status-indicating entity.

FIG. 3 illustrates how Data Element B, which is part of a data structure 52 (Data Structure B) can be switched from existing to non-existing status relative to that data structure (per the atomic switch operation 10 of FIG. 1). First, it should be noted that the outgoing existence structure 48 and the incoming existence structure 50 maintain respective pointers 48B and 50B to the existence switch 46. The existence switch 46 itself may be implemented as a pointer that stores the address of either the first existence array 54 or the second existence array 56. Initially, the existence switch 46 stores the address of the first existence array 54. The value of the first array element indicated by Data Element B's offset: 0 value (stored in offset field 48A) is "1", indicating that Data Element B exists as part of Data Structure B. The atomic switch operation 10 of FIG. 1 is carried out by atomically updating the Existence Switch 46 to store the address of the second existence array 56. After this is done, the value of the first array element indicated by Data Element B's offset: 0 value (stored in offset field 48A) will be "0", indicating nonexistence. It will be appreciated that the first and second existence arrays 54 and 56 could be replaced by other data types, such as bit vectors on machines where bit operations are faster than array accesses. For best results, the existence group structure 44 in FIG. 3 can be laid out contiguously in memory, preferably residing within the confines of a single cache line.

Note that would be possible to place the offset: 0 and offset: 1 values stored in the offset fields 48A and 50A directly into the data elements that reference them (e.g., by placing the offset: 0 value of offset field 48A within Data Element B). However, doing so would require that expensive read-side memory barriers be used both when reading and updating the data element's existence pointer and offset. The embodiment of FIG. 3 therefore places the offsets into the existence group structure 44.

Figure 4:
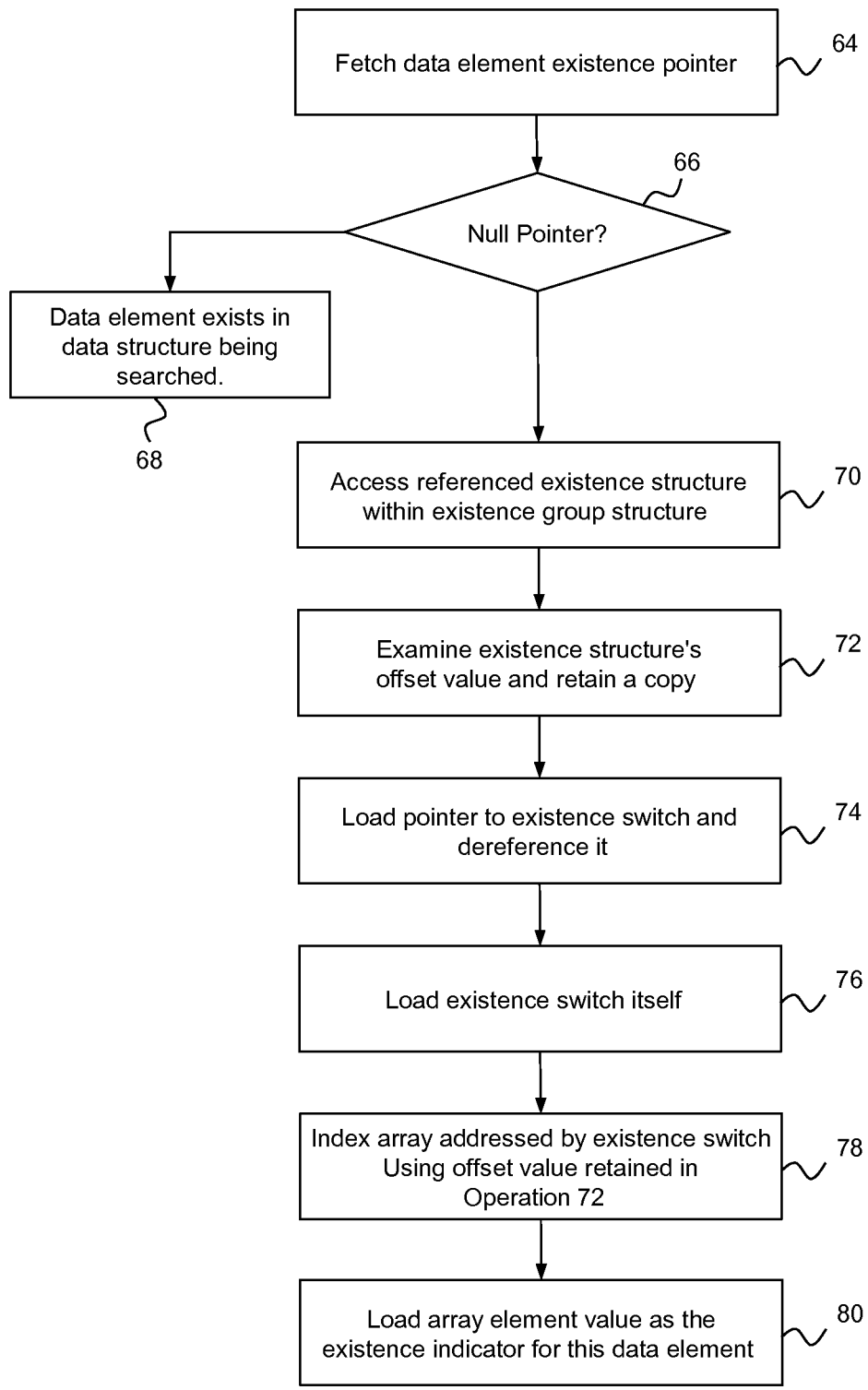
FIG. 4 is a flow diagram showing example operations for determining the validity status of a data element of a linked data structure, starting with a data element existence pointer.

With respect to each of Data Element A and Data Element B of FIG. 3, read-side operations can proceed as shown in FIG. 4 when these data elements are encountered during a linked data structure traversal. In operation 64 of FIG. 4 the data element's existence pointer is fetched.

Operation 66 of FIG. 4 checks whether the data element's existence pointer is a NULL pointer. If it is, operation 68 of FIG. 4 proceeds on the assumption that the element exists in the data structure being searched. Otherwise, processing continues with operation 70.

In operation 70 of FIG. 4, the existence pointer is dereferenced in order to access the referenced existence structure within the existence group structure (e.g., the outgoing existence structure or the incoming incoming existence structure).

In operation 72 of FIG. 4, the existence structure's offset value is examined and a copy is retained.

In operation 74 of FIG. 4, the existence structure's pointer to the existence switch of the existence group structure is loaded and dereferenced.

In operation 76 of FIG. 4, the existence switch itself is loaded.

In operation 78 of FIG. 4, the array addressed by the existence switch is indexed using the offset value retained in operation 72.

In operation 80 of FIG. 4, the value found in the corresponding array element is loaded and used as the existence indicator for this data element.

Referring back to FIG. 3, the existence implementation therein can be used to perform the atomic-move operation of FIGS. 1 and 2A-2H. First, a copy element 58 (Copy Element C) is made from Data element B. Copy Element C is linked into a destination data structure 62 (Data Structure C) where original Data Element B is to be moved. Copy Element C has an existence pointer 60 that is initialized to reference the incoming existence structure 50 in existence group structure 44. As described above, the existence switch 46 initially stores the address of the first existence array 54. The value of the second array element indicated by Copy Element C's offset: 1 value (stored in offset field 50A) is "0". Thus, Copy Element C is deemed not to exist as part of Data Structure C. The atomic switch operation 10 of FIG. 1 is carried out by atomically updating the Existence Switch 46 to store the address of the second existence array 56. After this is done, the value of the second array element indicated by Copy Element C's offset: 1 value (stored in offset field 50A) will be "1", indicating existence.

Note that the foregoing procedure can be elaborated in order to atomically move multiple data elements. In that case, several original data elements to be moved from their source data structure(s) will have existence pointers referencing the outgoing existence structure 48, and a corresponding number of copy elements created in the destination data structure(s) will have existence pointers referencing the incoming existence structure 50. This procedure can handle an arbitrary number of elements moving among an arbitrary number of data structures. However, one caveat of the procedure is that it only handles two states, a beginning state in which the outgoing elements exist and the incoming elements do not, and an ending state in which the incoming elements exist and the outgoing elements do not.

Figure 5:
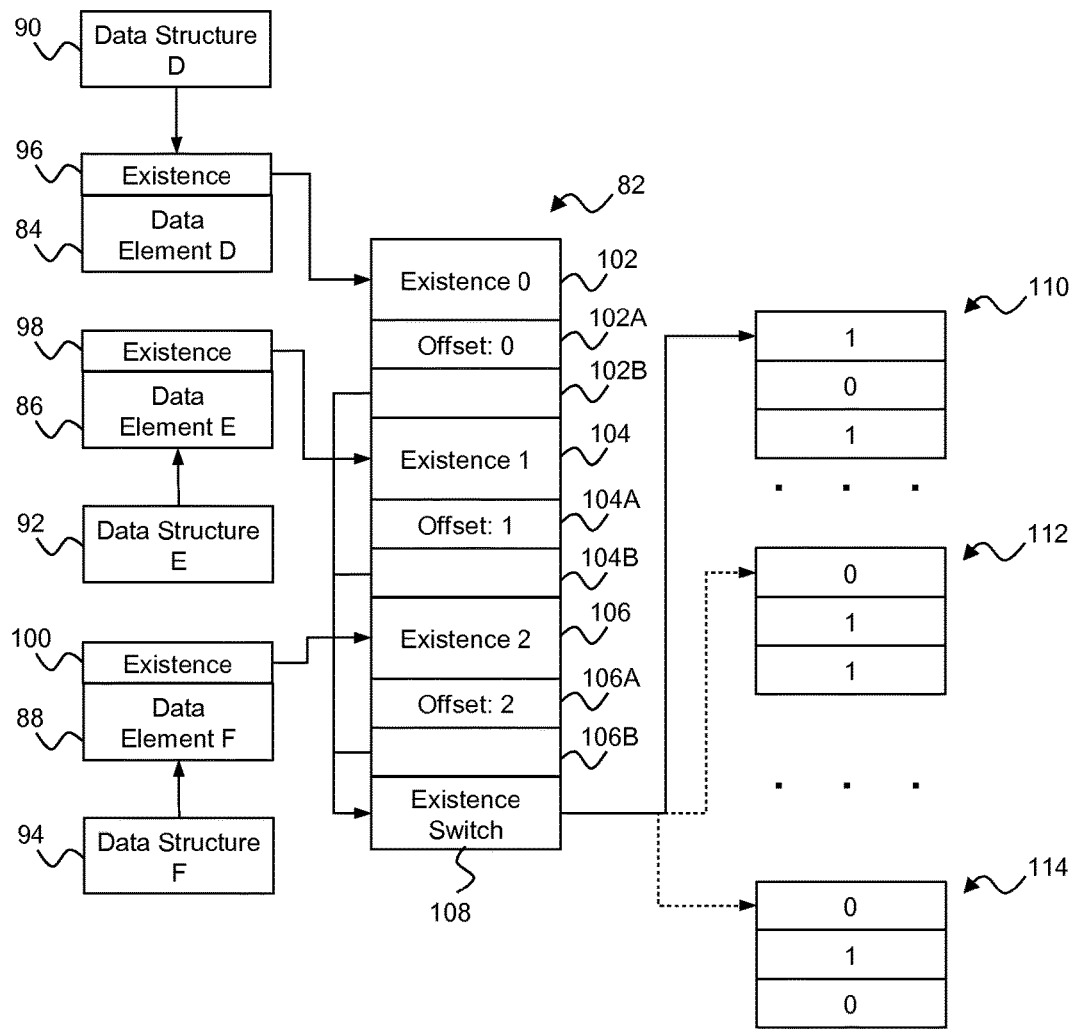
FIG. 5 is a functional block diagram showing another example implementation of the existence group structure of FIGS. 1 and 2A-2H being used to indicate the status of various data elements belonging to various linked data structures.

The foregoing approach can be extended to enable multiple transitions, providing what may be thought of as the data-structure equivalent of an animated GIF. This is shown in FIG. 5, which utilizes an expanded existence group structure 82 and additional existence arrays to accommodate plural data elements moving between plural data structures. In particular, there are three data elements 84 (Data Element D), 86 (Data Element E) and 88 (Data Element F) respectively linked into three data structures 90 (Data Structure D), 92 (Data Structure E) and 94 (Data Structure F). Data Elements D, E and F have respective existence pointers 96, 98 and 100. The existence pointers 96, 98 and 100 respectively reference three existence structures in the existence group structure 82, namely Existence Structure 0 with an offset: 0 value (shown by reference numbers 102 and 102A), Existence Structure 1 with an offset: 1 value (shown by reference numbers 104 and 104A), and Existence Structure 2 with an offset: 2 value (shown by reference numbers 106 and 106A). There is also an existence switch 108 and plural existence arrays, three of which are shown by reference numbers 110, 112 and 114. Each of Existence Structures 0, 1 and 2 maintains a pointer to the existence switch 108. These pointers are respectively shown by reference numbers 102B, 104B and 106B.

The existence group structure 82 and the use of plural existence arrays allows changes to the value of the existence switch 108 to, with a single store, atomically change the state of the three data structures (Data Structures D, E and F) to any of a pre-constructed set with an arbitrarily large number of members. With the example existence arrays 110, 112 and 114 shown in FIG. 4, the following example states are possible:

(1) When existence switch 108 addresses existence array 110, Data Element D exists in Data Structure D, Data Element E does not exist in Data Structure E, and Data Element F exists in Data Structure F.

(2) When existence switch 108 addresses existence array 112, Data Element D does not exist in Data Structure D, Data Element E exists in Data Structure E, and Data Element F exists in Data Structure F.

(3) When existence switch 108 addresses existence array 114, Data Element D does not exist in Data Structure D, Data Element E exists in Data Structure E, and Data Element F does not exist in Data Structure F.

As with the single-transition approach, it is possible to replace the existence arrays 110, 112 and 114 with bit vectors. Similarly, it is possible to place the offsets shown by reference numbers 102A, 106A and 108A into the three data elements (Data Elements D, E and F), though again at the cost of added memory-barrier operations.

Traversing any of Data Structure D, E or F during read-side operations operates in the same way as for the single-transition existence structure, as described in connection with FIG. 4. In particular, a NULL existence pointer still indicates that the data data element exists in the structure linking to it. The only difference is that the multiple-transition offsets can take on more values and that there can be more existence arrays.

Figure 6:
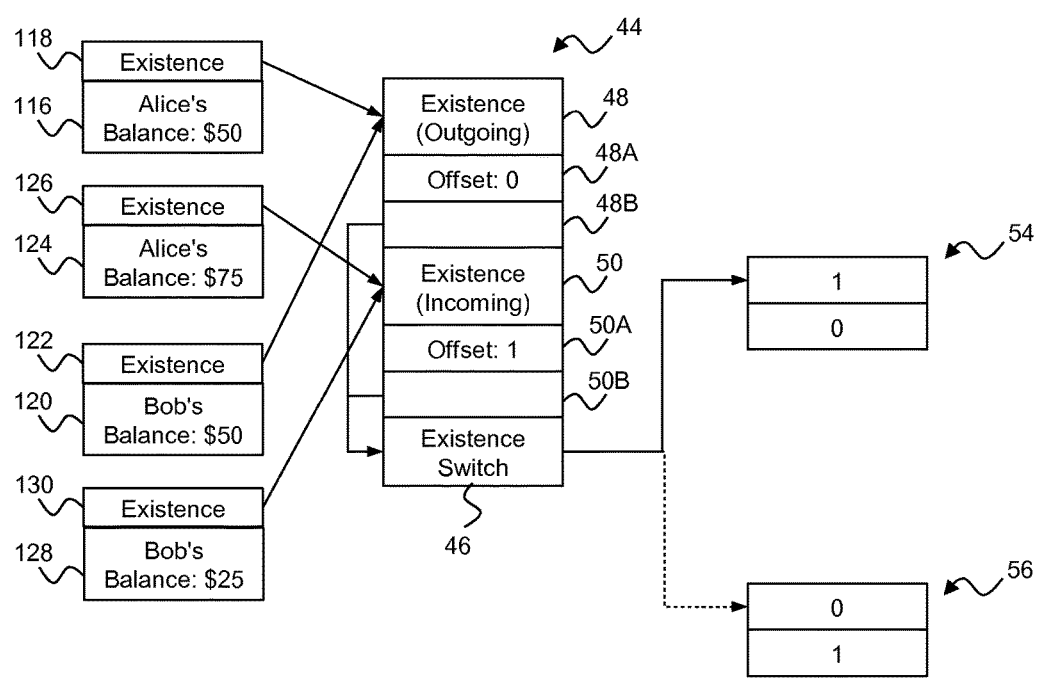
FIG. 6 is a functional block diagram showing another example implementation of the existence group structure of FIGS. 1 and 2A-2H being used to indicate the status of various data elements belonging to a single linked data structure.

As previously mentioned, the embodiments disclosed herein may be used for various purposes. For example, the single-transition existence group structure 44 of FIG. 3 may be used to implement bank transfers between account holders in an atomic manner (the "bank transfer" problem). This is shown in FIG. 6. Initially, there are two data elements, a first data element 116 with an existence pointer 118 referencing the outgoing existence structure 48, and a second data element 120 with an existence pointer 122 also referencing the outgoing existence structure 48. Data element 116 is shown to represent a bank balance for Alice of $50, and data element 120 is shown to represent a bank balance for Bob of $50. The goal is to atomically transfer $25 from Alice's account to Bob's account, updating the balances in each account simultaneously. Both of data elements 116 and 120 may be members of the same linked data structure, but may move within that data structure as a result of the funds transfer. This is essentially an atomic update operation.

To effect the atomic update, copies of data elements 116 and 120 are made. Data element 124 with an existence pointer 126 referencing the incoming existence structure 50 represents a copy of data element 116. It reflects the value of Alice's bank account after being credited $25. Data element 128 with an existence pointer 130 also referencing the incoming existence structure 50 represents a copy of data element 120. It reflects the value of Bob's bank account after being debited $25. The atomic update is effected by updating the existence switch 46 to change its value from the address of existence array 54 to the address of existence array 56.

Prior to the atomic transfer, existence array 54 is in effect. The data elements 116 and 120, representing Alice's and Bob's pre-transfer account values, will exist by virtue of their existence pointers 118 and 122 each referencing the outgoing existence structure 48 with its offset: 0 value stored at location 48A. This offset value signifies the first array element of existence array 54, which indicates existence by the stored value of 1. At the same time, the data elements 124 and 128, representing Alice's and Bob's post-transfer account values, will not exist due to their existence pointers 126 and 130 each referencing the incoming existence structure 48 with its offset: 1 value stored at location 50A. This offset value signifies the second array element of existence array 54, which indicates non-existence by the stored value of 0.

Following the atomic transfer, existence array 56 is in effect. The data elements 116 and 120, representing Alice's and Bob's pre-transfer account values, will no longer exist due to their existence pointers 118 and 122 each referencing the outgoing existence structure 48 with its offset: 0 value stored at location 48A. This offset value signifies the first array element of existence array 56, which indicates non-existence by the stored value of 0. At the same time, the data elements 124 and 128, representing Alice's and Bob's post-transfer account values, will exist by virtue of their existence pointers 126 and 130 each referencing the incoming existence structure 48 with its offset: 1 value stored at location 50A. This offset value signifies the second array element of existence array 56, which indicates existence by the stored value of 1.

Data Element Allegiance

The notion of data element allegiance allows a given data element to physically reside in two data structures at once, but logically be part of only some subset of them. Then, if the element's allegiance can be altered atomically, it will be seen to move atomically from one enclosing data structure to another. Although allegiance can be indicated by any number of tokens or identifiers, the disclosed embodiments use the address of the enclosing data structure. For example, in the case of a search tree, this address might that of the root of that tree, and in the case of a linked list, this address might be that of the list's header. Addresses can be written atomically on most modern systems, where "atomically" in this case means that concurrent reads of the location being written will see either the old value or the new value, but not a "mash-up" of the two values. This allows a single store instruction to atomically switch a given element's allegiance.

Figure 7:
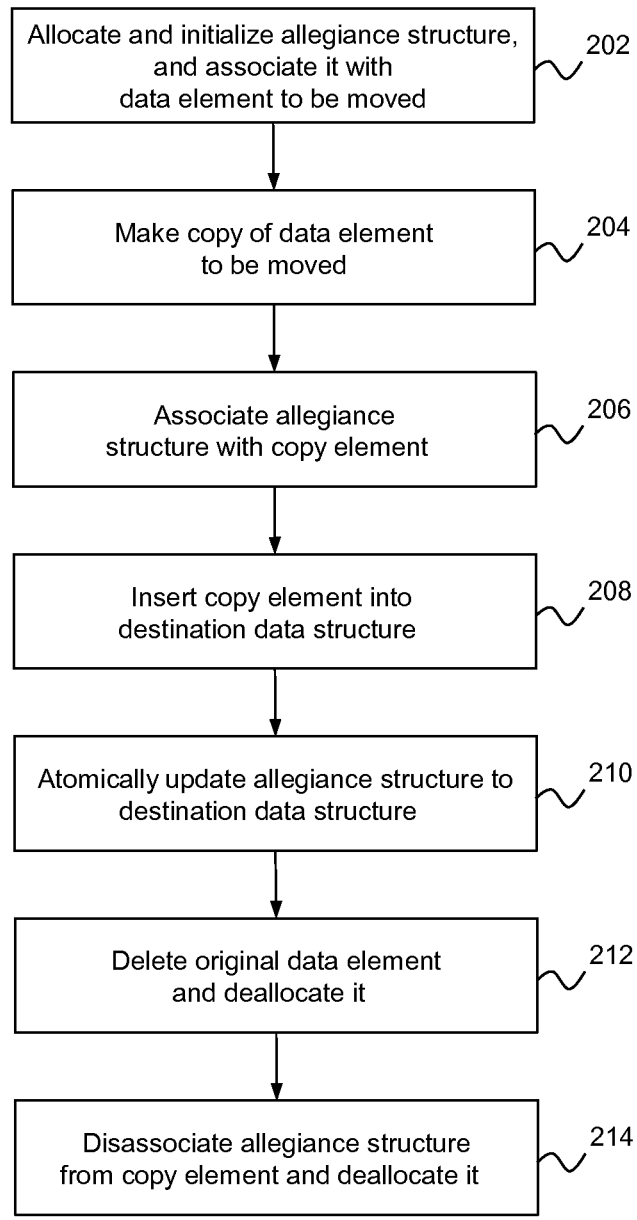
FIG. 7 is

Using the allegiance concept, an atomic move of a data element from a source data structure to a destination data structure may be carried out using the operations illustrated in FIG. 7.

In a first operation 202 of FIG. 7, an allegiance structure is allocated and initialized to indicate allegiance to the source data structure, and by implication, to indicate non-allegiance to any other data structure. The allegiance structure is associated with the data element to be moved. Due to its initialized state showing allegiance to the source data structure, the allegiance structure indicates that the data element is a valid member of the source data structure.

In a second operation 204 of FIG. 7, a copy is made of the data element to be moved. In cases where the data element cannot be copied, a level of indirection may be introduced. This allows a pointer to the data element to be copied, thus allowing external pointers to that data element to be maintained throughout the atomic move operation.

In a third operation 206 of FIG. 7, the allegiance structure allocated in operation 202 is associated with the copy element.

In a fourth operation 208 of FIG. 7, the copy element is inserted into the destination data structure. Because the copy element's allegiance is still to the source data structure (due to the earlier initialization of the allegiance structure), the allegiance structure indicates that the copy element is not a valid member of the destination data structure, and any search for the copy element in the destination data structure will fail.

In a fifth operation 210 of FIG. 7, the allegiance structure is atomically updated to change its allegiance from the source data structure to the destination data structure. This may be referred to as the allegiance switch operation. At this point, the allegiance structure indicates that the original data element is no longer a valid member of the source data structure, and searches for the original data element in the source data structure will start failing. Meanwhile, the allegiance structure indicates that the copy element is a valid member of the destination data structure, and searches for the copy element in the destination data structure will start succeeding.

In a sixth operation 212 of FIG. 7, the original data element is deleted from the source data structure and deallocated.

In a seventh operation 214 of FIG. 7, the allegiance structure is disassociated from the copy element and deallocated.

The foregoing operations of FIG. 7 are illustrated graphically in FIGS. 8A-8H.

Figure 8A:
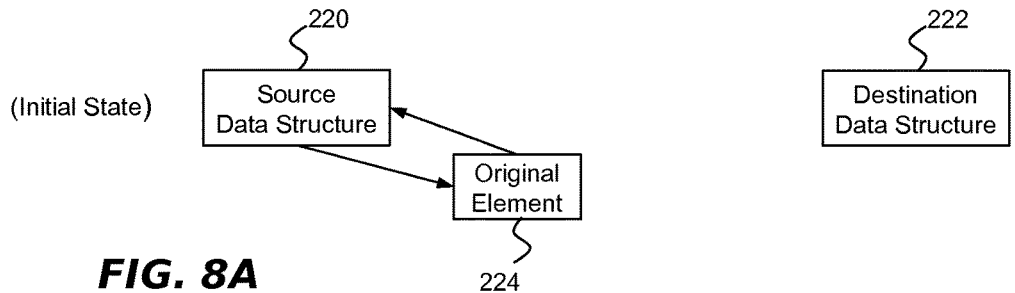
FIGS. 8A-8H are diagrammatic representations corresponding to the operations shown in the flow diagram of FIG. 7 using an allegiance structure.

FIG. 8A shows an initial state in which there is a source data structure 220, a destination data structure 222, and an original data element 224 that is to be atomically moved from the source data structure to the destination data structure.

Figure 8B:
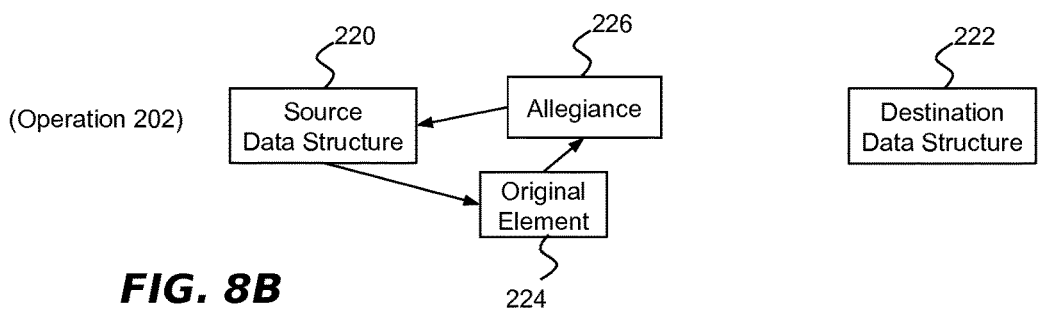

Per operation 202 above, FIG. 8B shows the allocation of an allegiance structure 226, which is initialized to reference the source data structure 220 (e.g., by setting a pointer in the allegiance structure), and is associated with the original data element 224 (e.g., by setting a pointer in the data element).

Figure 8C:
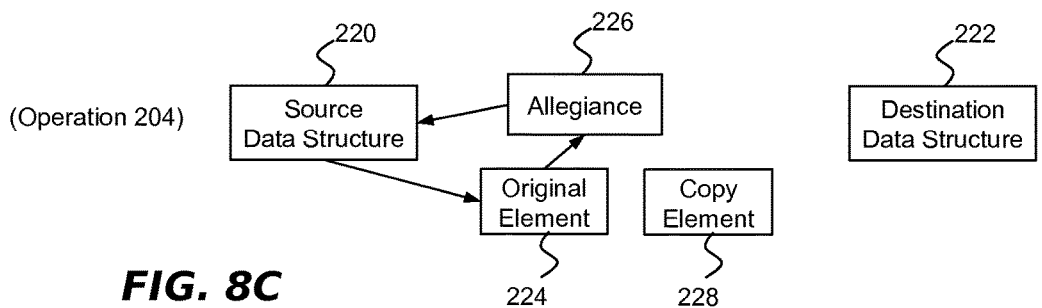

Per operation 204 above, FIG. 8C shows a copy 228 of the original element 24 to be moved.

Figure 8D:
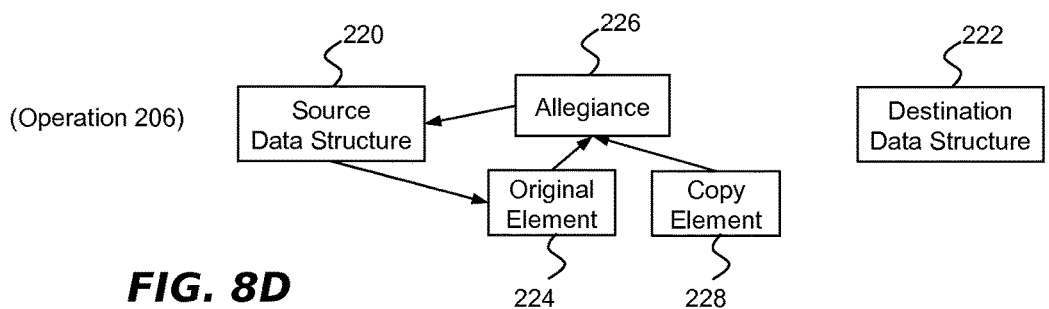

Per operation 206 above, FIG. 8D shows the allegiance structure 226 being associated with the copy element 228 (e.g., by setting a pointer in the copy element).

Figure 8E:
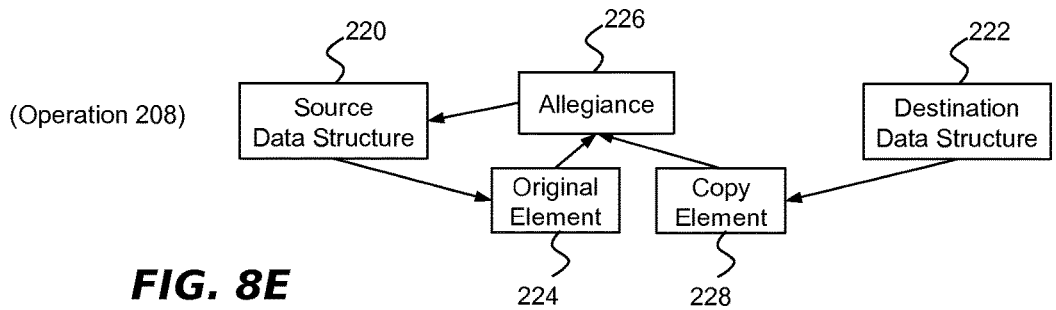

Per operation 208 above, FIG. 8E shows the copy element 228 being inserted into the destination data structure 222.

Figure 8F:
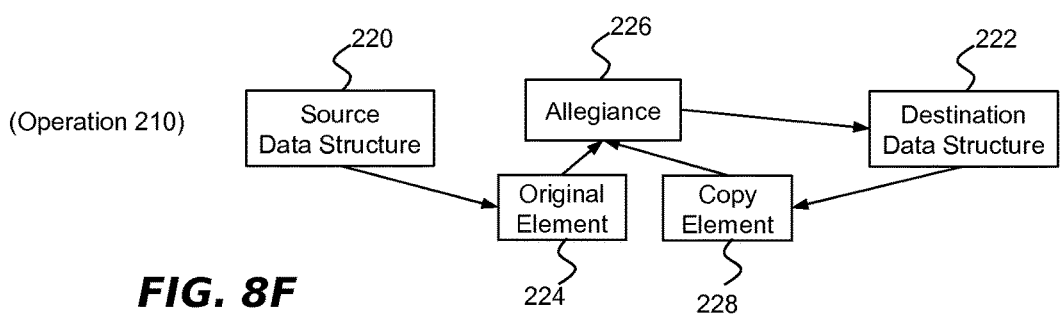

Per operation 210 above, FIG. 8F shows the allegiance structure 226 being atomically switched (e.g., by updating its pointer) from the source data structure 220 to the destination data structure 222 (the allegiance switch operation).

Figure 8G:
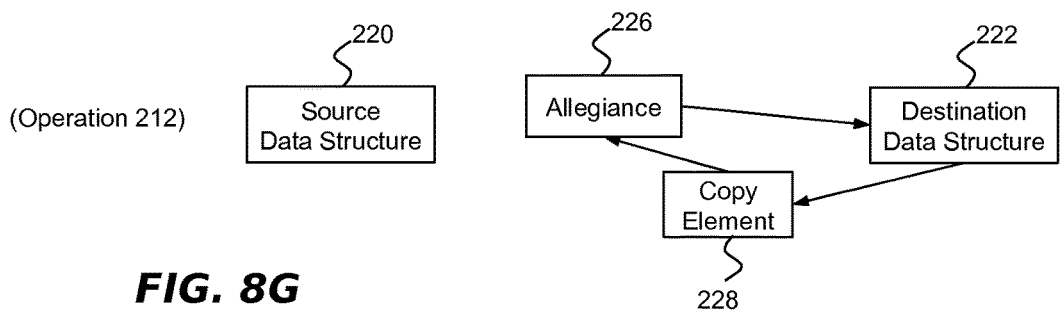

Per operation 212 above, FIG. 8G shows the original data element 224 having been deleted from the source data structure 220 and deallocated.

Figure 8H:
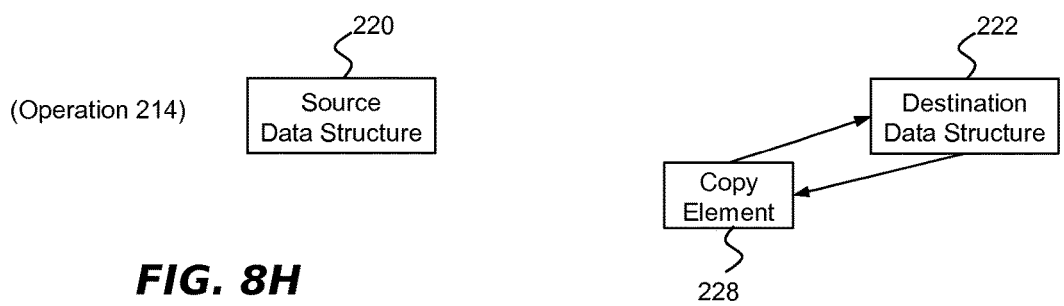

Per operation 214 above, FIG. 8H shows the allegiance structure 226 having been disassociated from the copy element 228 and deallocated.

In some embodiments, an allegiance structure may be permanently associated with each data element, in which case move-time allocation and deallocation is unnecessary. However, performing move-time allocation and deallocation allows for more efficient allegiance checking in the common case where a given element is not being moved.

Other embodiments introduce the restriction that a given data element can only be part of one particular linked data structure. This data element is then either in or out, but if it is in, the identity of the data structure that it is a member of is implicit in the linkage from that data structure to this particular data element. This restriction allows complex multi-element atomic operations to be set up more simply. It also allows a given data element to be moved (via either copying or indirection) from one place to another within the same data structure. As described below, it also permits a solution to the "bank transfer" problem.

Note that the deallocation of the allegiance structure and the original data element should be deferred in order to avoid disrupting concurrent readers. This deferral may be carried out via any convenient deferred-destruction mechanism, including garbage collectors, reference counters, hazard pointers, or Read-Copy Update (RCU). Embodiments disclosed herein use RCU. The selected mechanism should guarantee no lockless reader will be referencing the original data element or the existence group structure when these entities are deallocated.

Different types of allegiance implementations may be used. One type may be used when all data elements to be moved have the same source data structure and the same destination data structure. Another type may be used when the data elements are to move among several different data structures. The second implementation is also suited for bidirectional atomic movement between a pair of data structures.

Figure 9:
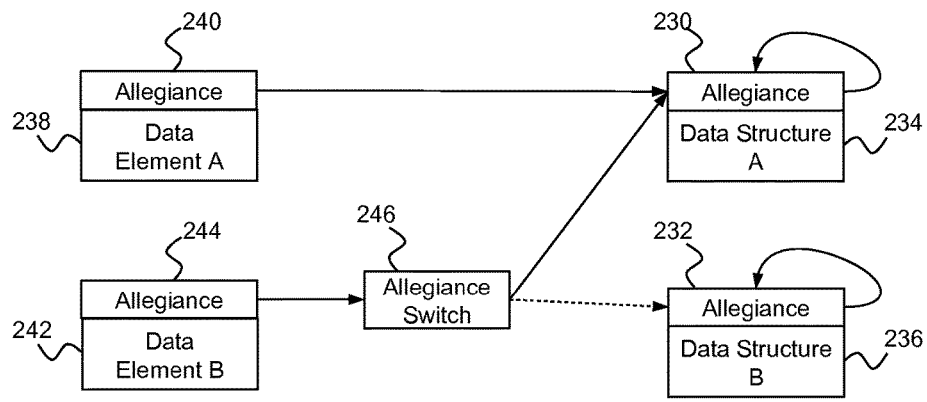
FIG. 9 is a functional block diagram showing an example implementation of the allegiance structure of FIGS. 1 and 2A-2H being used to indicate the status of various data elements belonging to various linked data structures.

In the same-source/same-destination case, each linked data structure has an allegiance structure embodied as a self-referencing allegiance pointer. This is illustrated in FIG. 9 by the self-referencing allegiance pointers 230 and 232 that are respectively embodied as fields of data structures 234 (Data Structure A) and 236 (Data Structure B). A data element's allegiance linkage can take one of two forms. The first form of the same-source/same-destination case is used when a data element is not moving, and is exemplified in FIG. 9 by data element 238 (Data Element A), which has its own allegiance pointer 240 stored in a field of the data element. This form is implemented by having the data element's allegiance pointer 240 reference the associated data structure's allegiance pointer 230.

The second form of the same-source/same-destination case is used to atomically move elements, and is exemplified in FIG. 9 by data element 242 (Data Element B), which has an allegiance pointer 244 stored in a field of the data element. Here, Data Element B's allegiance pointer 244 references an allegiance switch 246, which is a memory location storing a pointer that can be overwritten in order to atomically switch the allegiance of a group of data elements, in this case, from Data Structure A to Data Structure B. The allegiance switch 246 represents an embodiment of the allegiance structure 226 of FIGS. 8A-8H, which is itself an embodiment of a status-indicating entity for the data elements that reference them.

Note that the self-referencing nature of the allegiance pointers 232 and 234 of Data Structure A and Data Structure B means that the read-side operations need not distinguish between the two forms of data-element allegiance. In both cases, processing can proceed as follows:

(1) Fetch the data element's allegiance pointer. In the first form, the result is a pointer to the enclosing data structure's allegiance field, while in the second form, the result is a pointer to the allegiance switch.

(2) Dereference the pointer fetched in the preceding step. In the first form, the result is still a pointer to the enclosing data structure's allegiance field, and in the second form, the result is also a pointer to the enclosing data structure's allegiance field.

A useful optimization (carried out by the disclosed embodiments) is to first compare the data element's allegiance pointer to the allegiance switch's pointer to the suspected enclosing data structure's allegiance field. This optimization can eliminate cache misses that might otherwise be incurred by repeatedly fetching the enclosing data structure's allegiance structure.

Given this optimization, it would in some cases be possible to make the data structure's allegiance field store NULL pointers rather than self-referencing pointers. However, doing so prevents quick allegiance switches in overlapping data structures. For example, if several tree root data structures referenced the same set of node data elements, then allegiance switches could provide the appearance of switching among these several trees, but without the need to undertake actual insertion, deletion, or rebalancing operations. The disclosed embodiments therefore use self-referencing allegiance pointers for the enclosing data structures.

The implementation of FIG. 9 fits into the atomic-move conceptual procedure described in connection with FIG. 7, with the allegiance switch 246 in FIG. 9 taking the role of the allegiance structure 226 shown in FIGS. 8A-8H. If Data Element B is to be moved from Data Structure A to Data Structure B, a copy of Data Element B (not shown) would be created and linked into Data Structure B. The copy's allegiance pointer would reference the allegiance switch 246, which itself initially references the allegiance field 230 of Data Structure A. To switch allegiance, the allegiance switch's pointer is atomically updated to reference the allegiance field 232 of Data Structure B. As noted in the discussion of operation 210 of FIG. 7, searches for Data Element B in Data Structure A will start failing because its allegiance is now to Data Structure B. However, searches for Data Element B in Data Structure B will succeed because the allegiance of the copy of Data Element B is now to Data Structure B.

Note that any number of data elements may reference the same allegiance structure (or allegiance switch in the implementation of FIG. 9), in which case all of them will atomically change allegiance simultaneously. The procedure described in connection with FIGS. 7 and 8A-8H takes advantage of this property to simultaneously change the allegiance of the original data element 224 and the copy element 228, effecting an atomic move from the source data structure 220 to the destination data structure 222. This can be easily elaborated in order to atomically move multiple data elements, as long as they are all moving from the same source and to the same destination.

Figure 10:
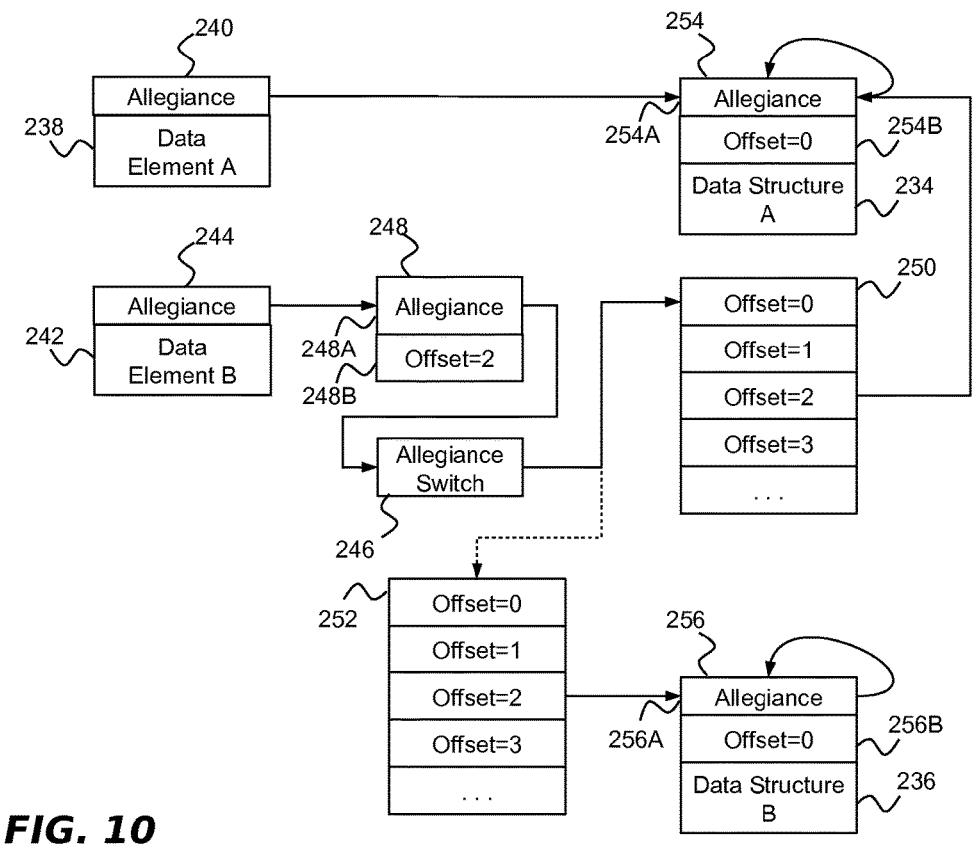
FIG. 10 is a functional block diagram showing another example implementation of the allegiance structure of FIGS. 1 and 2A-2H being used to indicate the status of various data elements belonging to various linked data structures.

Atomically moving multiple data elements among multiple data structures requires additional levels of indirection, as shown in FIG. 10. The first additional level of indirection is an allegiance/offset structure 248 that includes an allegiance pointer 248A and an offset field 248B that is shown to be set to an offset=2 value. The allegiance pointer 248A references the allegiance switch 246. The offset value stored in the offset field 248B corresponds to the element number of a pair of first and second allegiance state arrays 250 and 252. Each array element stores a pointer to the allegiance field of a particular data structure. The offset=2 value stored in the offset field 248B of the allegiance/offset structure 248 refers to the third element of each allegiance state array 250 and 252. In the allegiance state array 250, the third array element is a pointer referencing the allegiance field 254A of an allegiance/offset structure 254 in Data Structure A. The allegiance/offset structure 254 also has an offset field 254B. In the allegiance state array 252, the third array element is a pointer referencing the allegiance field 256A of an allegiance/offset structure 256 in Data Structure B. The allegiance/offset structure 256 also has an offset field 256B.

The allegiance state arrays 250 and 252 are the second additional level of indirection for this implementation of atomically moving multiple data elements among multiple data structures. It will be appreciated that although the allegiance state arrays 250 and 252 are depicted as separate data structures, they could also be implemented at different locations within a single large array. Note that it is possible to place the offset of the allegiance/offset structure 248 directly into the associated data element (Data Element BA in this case), but doing so requires that expensive read-side memory barriers be used both when reading and updating the data element's allegiance pointer and offset. This overhead will typically be acceptable only when the common case is optimized, where the data element's allegiance pointer directly references the enclosing data structure's allegiance field. However, an alternative optimization places the allegiance/offset structure 248, the allegiance switch 246, and the allegiance state arrays 250 and 252 into the same memory block. This alternative optimization minimizes the impact of the separate allegiance-offset pointers, and furthermore reduces the memory footprint of the data elements. The disclosed embodiments therefore use this alternative optimization, so that the data layout is as shown in FIG. 10.

The allegiance switch 246 stores a pointer to one of the allegiance state arrays 250 and 252. As in the case of FIG. 9, the allegiance switch 246 can be overwritten in order to atomically switch the allegiance of one or more data elements. In FIG. 10, data Element B is initially part of Data Structure A, but can be atomically switched to Data Structure B with a single update to the allegiance switch 246. It will be seen that Element B's allegiance pointer 244 references the allegiance/offset structure 248. The allegiance pointer 248A of the allegiance/offset structure 248 references the allegiance switch 246, and the offset field 248B stores the offset=2 value. The allegiance switch 246 stores the address of allegiance state array 250. The third array element at the offset=2 location in array 250 references the allegiance field 254A of Data Structure A, such that Data Element B is deemed to be a member of Data Structure A. When the allegiance switch 246 is updated to reference allegiance state array 252 instead of allegiance state array 250, Data Element B is atomically moved to Data Structure B. This is because the third array element at the offset=2 location in array 252 references the allegiance field 256A of Data Structure B, such that Data Element B is now deemed to be a member of Data Structure B.

Each array element of the allegiance state arrays 250 and 252 determines the allegiance of any data element that references the array element via the data element's allegiance pointer, the allegiance/offset structure 248 and the allegiance switch 146. The term "allegiance" as used herein means that the data element has "allegiance" to, and is a valid member of the data structure to which it is linked. As an alternative to asserting that the data element has "allegiance" to that data structure, one could use other descriptive terminology, such as the data element "exists" in the data structure, or has "validity" with respect to the data structure. No matter what terminology is used, the underlying concept is that any reader encountering a data element during a search of a linked data structure will be able to ascertain the data element's status relative to the data structure, and thereby know whether to accept the data element as valid or ignore it. It will thus be appreciated that the allegiance/offset structure 248, the allegiance switch 246, and the allegiance state arrays 250 and 252 function as an embodiment of the allegiance structure 226 of FIGS. 8A-8H, which is itself an embodiment of a status-indicating entity for the data elements that reference them.

As in the case of FIG. 9, the implementation of FIG. 10 fits into the atomic-move conceptual procedure described in connection with FIG. 7, with the allegiance switch 246 in FIG. 10 taking the role of the allegiance structure 226 shown in FIGS. 8A-8H. If Data Element B is to be moved from Data Structure A to Data Structure B, a copy of Data Element B (not shown) would be created and linked into Data Structure B. The copy's allegiance pointer would reference the allegiance/offset structure 248 that itself references the allegiance switch 246 and stores an offset value for indexing the allegiance status arrays 250 and 252. The allegiance switch 246 initially references allegiance status array 250, whose offset=2 element references Data Structure A. Both Data element B and its copy will initially have allegiance to Data Structure A based on the offset=2 value stored in the offset field 248B of the allegiance/offset structure 248. To switch allegiance, the allegiance switch's pointer is atomically updated to reference allegiance status array 250, whose offset=2 element references Data Structure B. As noted in operation 210 above, searches for Data Element B in Data Structure A will start failing because its allegiance is now to Data Structure B. However, searches for the copy of Data Element B in Data Structure B will succeed because its allegiance is now to Data Structure B.

As noted above, each of Data Structure A and B respectively maintain an allegiance/offset structure 254 and 256 in lieu of the allegiance pointers 230 and 232 shown in FIG. 9. As with the single source/destination scheme discussed above, the self-referencing nature of the allegiance pointers 254A and 256A of Data Structure A and Data Structure B means that the atomic move operation need not distinguish between the steady-state case represented by Data Element A and the in-motion case represented by Data Element B. In both cases, the read-side processing can proceed as shown in FIG. 11.

Figure 11:
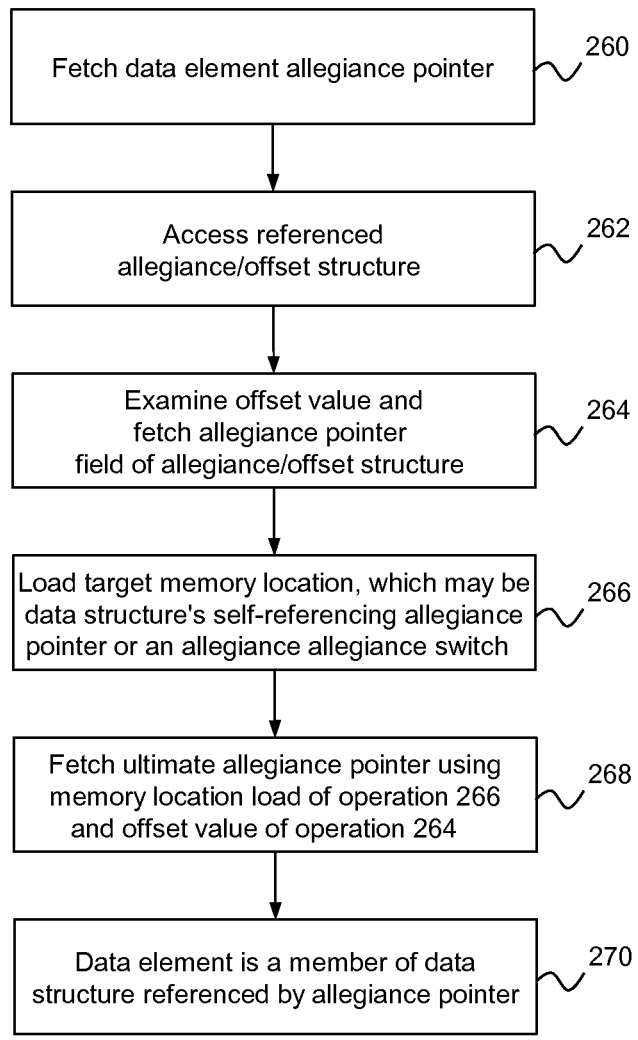
FIG. 11 is a flow diagram showing example operations for determining the validity status of a data element of a linked data structure, starting with a data element allegiance pointer.

In operation 260 of FIG. 11 the data element's allegiance pointer is fetched. In the first form (applicable to the allegiance pointer 240 of Data Element A), the result a pointer to the enclosing data structure's allegiance/offset structure 254. In the second form (applicable to the allegiance pointer 244 of Data Element B), the result is a pointer to the allegiance-offset structure 248.

Using the allegiance pointer fetched in operation 260, operation 262 of FIG. 11 references the indicated allegiance/offset structure, and operation 264 examines its offset value and fetches its allegiance pointer. In the first form (applicable to Data Element A), the value in the offset field 254B of Data Structure A's allegiance/offset structure 254 is offset=0, and the allegiance pointer 254A references itself. In the second form (applicable to Data Element B), the value in the offset field 248B of the allegiance/offset structure 248 is offset=2, and the allegiance pointer 248 references the allegiance switch 246.

Given the allegiance pointer fetched in operation 264, operation 266 of FIG. 11 loads the referenced memory location. As noted above, in the first form (applicable to Data Element A), the target data structure is the self-referencing allegiance pointer 254A of Data Structure A, so operation 266 returns that allegiance pointer. In the second form (applicable to Data Element B), the referenced memory location is the allegiance switch 246.

Given the memory location load in operation 266, and the offset value determined in operation 264, operation 268 fetch the ultimate allegiance pointer. In the first form (applicable to Data Element A), the offset value was offset=0, so the result still references Data Structure A's allegiance pointer 254A, while in the second form (applicable to Data Element B) the offset value was offset=2, signifying the allegiance pointer stored in the third array element of allegiance state array 250, which in turn references the allegiance pointer 254A of the Data Structure A.

In operation 270 of FIG. 11, the data element is deemed to be a member of the data structure referenced by the allegiance pointer found in operation 268. For Data Element A, this is Data Structure A. For Data Element B, this is initially also Data Structure A, then becomes Data Structure B when the allegiance switch 246 is updated.

Given the large number of levels of indirection, the optimization of first comparing the data element's allegiance pointer to the address of the suspected enclosing data structure's allegiance field is especially valuable. The merits of a NULL pointer in this allegiance field are similar to those for single source/destination allegiance implementations. Also, as before, this implementation fits into the atomic-move conceptual procedure described in connection with FIG. 7, but with the combination of the allegiance/offset structure 248, the allegiance switch 246, and the allegiance state tables 250 and 252 playing the role of the allegiance structure. Operations 204-208 and 212 of that procedure must of course be carried out for each data element being moved.

Figure 12:
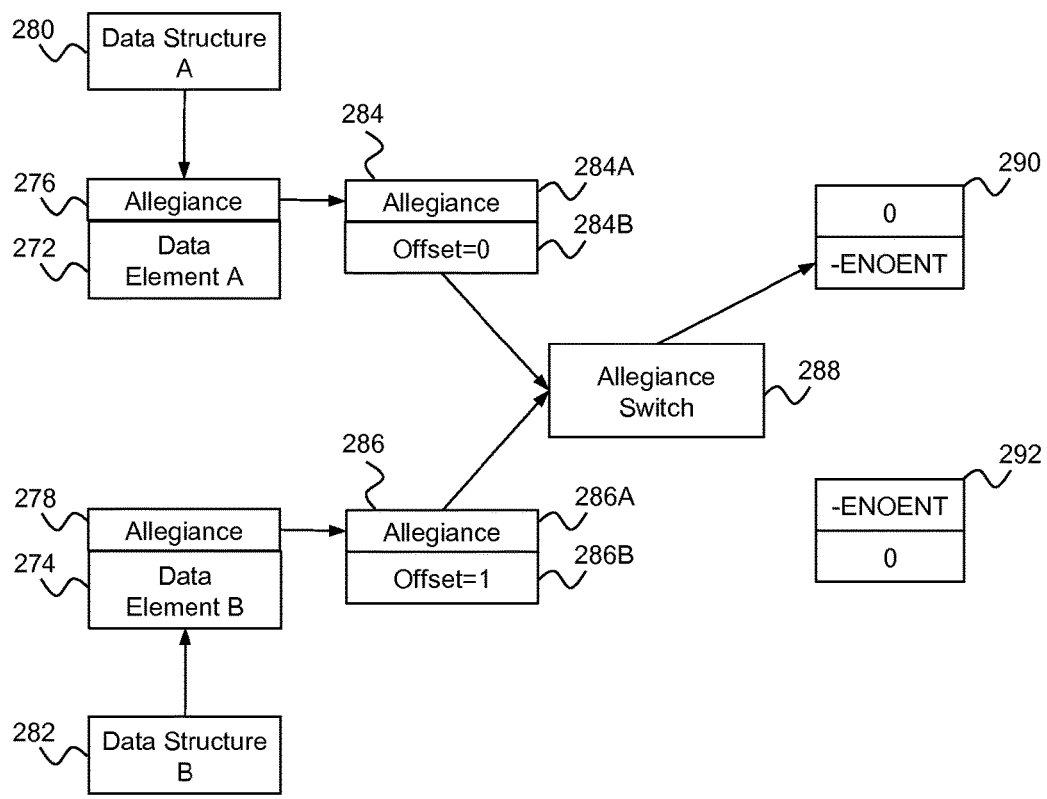
FIG. 12 is a functional block diagram showing another example implementation of the allegiance structure of FIGS. 1 and 2A-2H being used to indicate the status of various data elements belonging to various linked data structures.

Turning now to FIG. 12, an example layout is shown for the "in-or-out" scenario in which the allegiance concept is used to atomically move one or more data elements in or out of one or more data structures. This approach does not use the allegiance state arrays 250 and 252 described in connection with FIG. 10. Instead, existence arrays are used that are similar to the existence arrays 54 and 56 described in connection with FIG. 3. FIG. 12 illustrates first and second data elements 272 (Data Element A) and 274 (Data Element B), each having a respective allegiance pointer 276 and 278. Data Element A is linked into a first data structure 280 (Data Structure A) and Data Element B is linked into a second data structure 282 (Data Structure B).

Data Element A and Data Element B may normally have a NULL allegiance pointer (not shown), indicating that each data element is a member of the data structure into which it is linked. Therefore, for Data Elements A and B to be considered as elements of Data Structures A and B, respectively, their respective allegiance pointers 276 and 278 would each be NULL.

However, FIG. 12 illustrates a state in which Data Element A is a member of Data Structure A, but Data Element B is not a member of Data Structure B. To see why this is so, consider that Data Element A and Data Element B respectively link to allegiance/offset structures 284 and 286. Allegiance/offset structure 284 includes an allegiance pointer 284A and an offset field 284B that is shown to be set to an offset=0 value. Allegiance/offset structure 286 includes an allegiance pointer 286A and an offset field 286B that is shown to be set to an offset=1 value. The allegiance pointers 284A and 286A references an allegiance switch 288. The allegiance switch 288 references one of two existence arrays 290 and 292. The offset values stored in the respective offset fields 284B and 286B of the allegiance/offset structures 284 and 286 correspond to an element of the existence arrays 290 and 292. Each such element contains a value indicating whether or not a data element is a member of the data structure to which it is linked. It will be appreciated that although the existence arrays 290 and 292 are depicted as separate data structures, they could also be implemented at different locations within a single large array.

In FIG. 12, the allegiance switch 288 initially references existence array 290, which is a two-element array. Insofar as Data Element A's allegiance/offset structure 284 has an offset=value stored in the offset field 284B, Data Element A's allegiance is determined from the zero-valued element of existence array 290. This is the first array element, and is shown to store a value of 0, which for purposes of example may be interpreted to signify that Data Element A is to be considered a member of its data structure, namely Data Structure A. Other agreed upon array values could also be used to provide the same indication. Similarly, insofar as Data Element B's allegiance/offset structure 286 has an offset=1 value stored in the offset field 286B, Data Element B's allegiance is determined from the one-valued element of existence array 290. This is the second array element, and is shown to store an error code, in this case −ENOENT (no such file or directory), which for purposes of example may be interpreted to signify that Data Element B is not considered a member of its data structure, namely Data Structure B. Other agreed upon array values could also be used to provide the same indication.

Updating the allegiance switch 288 to reference the existence array 292 will atomically swap the status of the two data elements. Thus, the update will atomically remove Data Element A from Data Structure A and add Data Element B to Data Structure B. Once this switch has taken place, Data Element A may be unlinked from Data Structure A and Data Element B's allegiance pointer may be set to NULL. The two allegiance/offset structures 284 and 286, the allegiance switch 288, and the existence arrays 290 and 292, are then available for reuse once all pre-existing reader traversals through these entities have completed.

It will be seen that the allegiance layout of FIG. 12 may be used to implement the atomic move operation described in connection with FIGS. 7 and 8A-8H. In that case, Data Element B could be a copy of Data Element A made for the purpose of atomically moving Data Element A from Data Structure A to Data Structure B.

As previously mentioned, the embodiments disclosed herein may be used for various purposes. For example, the two allegiance/offset structures 284 and 286, the allegiance switch 288, and the existence arrays 290 and 292 may be used for atomic bank transfers between account holders (the "bank transfer" problem), which is a data update operation that may involve atomically moving data elements within a single data structure.

Figure 13:
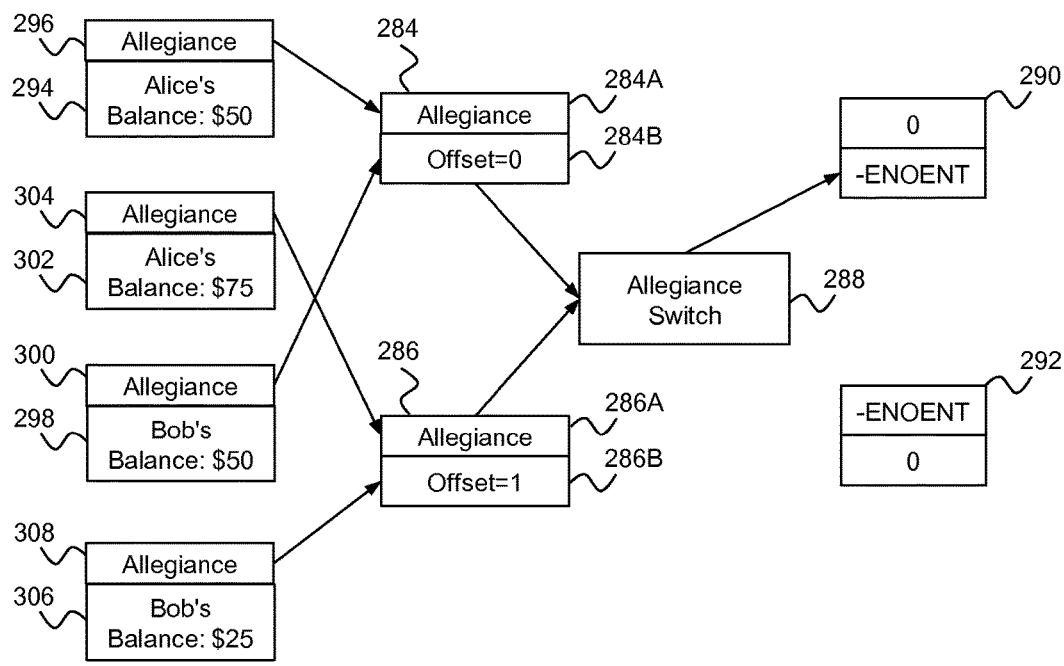
FIG. 13 is a functional block diagram showing another example implementation of the allegiance structure of FIGS. 1 and 2A-2H being used to indicate the status of various data elements belonging to a single linked data structure.

This is shown in FIG. 13. Initially, there are two data elements, a first data element 294 with an allegiance pointer 296 referencing the allegiance/offset structure 284, and a second data element 298 with an allegiance pointer 300 also referencing the allegiance/offset structure 284. Data element 294 is shown to represent a bank balance for Alice of $50, and data element 298 is shown to represent a bank balance for Bob of $50. The goal is to atomically transfer $25 from Alice's account to Bob's account, updating the balances in each account simultaneously. Both of data elements 294 and 298 may be members of the same data structure (not shown), but may move within that data structure as a result of the funds transfer. This is essentially an atomic update operation.

To effect the atomic update, a copies of data elements 294 and 298 are made. Data element 302 with an allegiance pointer 304 referencing the allegiance/offset structure 286 represents a copy of data element 294. It reflects the value of Alice's bank account after being credited $25. Data element 306 with an allegiance pointer 308 also referencing the allegiance/offset structure 286 represents a copy of data element 298. It reflects the value of Bob's bank account after being debited $25. The atomic update is effected by updating the allegiance switch 288 to change its value from the address of existence array 290 to the address of existence array 292.

Prior to the atomic transfer, existence array 290 is in effect. The data elements 294 and 298, representing Alice's and Bob's pre-transfer account values, will be deemed to be valid members of their containing data structure by virtue of their allegiance pointers 296 and 300 each referencing the allegiance/offset structure 284 with its offset=0 value stored at location 284B. This offset value signifies the first array element of existence array 290, which indicates valid data structure membership by storing a value of 0. At the same time, the data elements 302 and 306, representing Alice's and Bob's post-transfer account values, will not be valid due to their allegiance pointers 304 and 308 each referencing the allegiance/offset structure 286 with its offset=1 value stored at location 286B. This offset value signifies the second array element of existence array 290, which indicates non-valid data structure membership by storing the −ENOENT error code.

Following the atomic transfer, existence array 292 is in effect. The data elements 294 and 298, representing Alice's and Bob's pre-transfer account values, will no longer be valid members of their containing data structure due to their allegiance pointers 296 and 300 each referencing the allegiance/offset structure 284 with its offset=0 value stored at location 284B. This offset value signifies the first array element of existence array 292, which indicates non-valid data structure membership by storing the −ENOENT error code. At the same time, the data elements 302 and 306, representing Alice's and Bob's post-transfer account values, will be valid members of their containing data structure by virtue of their allegiance pointers 304 and 308 each referencing the allegiance/offset structure 286 with its offset=1 value stored at location 286B. This offset value signifies the second array element of existence array 292, which indicates valid data structure membership by storing a value of 0.

For both of the existence and allegiance techniques described above, partitionable data structures can scalably use fully locked updates. However, attempts to take this approach with trees or linked lists may result in debilitating bottlenecks on the locks associated with the root or header nodes. Therefore, it is preferable that concurrent updates, including concurrent atomic moves, augment locking with some other synchronization mechanism. Fortunately, updates to these data structures are typically localized, so that the update can be divided into a search phase that locates the area to be updated, and the actual update itself. The embodiments disclosed herein may use read-friendly synchronization mechanisms such as RCU to protect the search and locking to protect the update. Because a data structure can change while the locks are being acquired, a validation operation may be performed once the locks are acquired. If the validation operation fails, the locks are released and the update is retried from the beginning One strength of the procedures described above is that locks need not be held across update operations, which greatly simplifies usage and deadlock avoidance.

Figure 14:
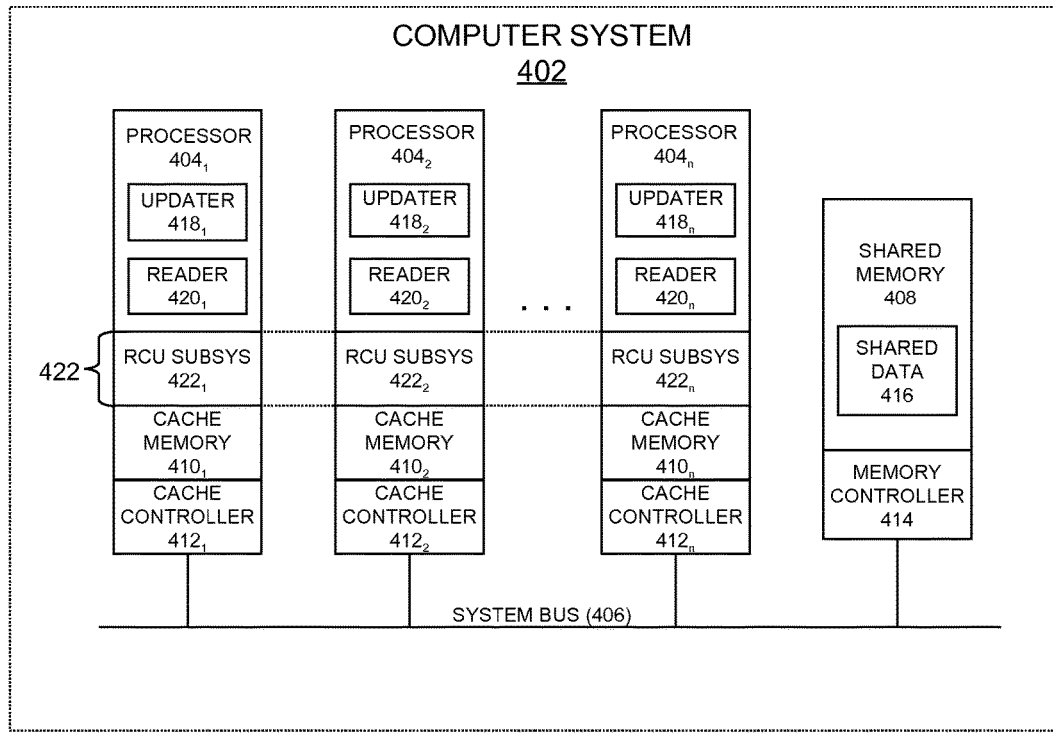
FIG. 14 is a functional block diagram showing an example computer system whose operation may be enhanced by providing the capability to atomically move a data element of a linked data structure without delaying lockless readers.

Turning now to the FIG. 14, an example computing environment is illustrated in which atomic move operations as described above may be implemented in order to improve computer operation. In particular, an example computer system 402 is shown in which one or more processors $404_1$, $404_2 \ldots 404_n$ are operatively connected by way of a common bus 406 (or other interconnection pathway) to a shared memory 408. Respectively associated with each processor $404_1$, $404_2 \ldots 404_n$ is a cache memory $410_1$, $410_2 \ldots 410_n$ and a cache controller $412_1$, $412_2 \ldots 412_n$. A memory controller 414 is associated with the shared memory 408. It stores shared data that is accessed by data processing operations that variously run on the processors $404_1$, $404_2 \ldots 404_n$. This data may include linked data structures and data elements thereof that are to be atomically moved.

The computer system 402 may represent any of several different types of computing apparatus. Examples include, but are not limited to, general purpose computers, special purpose computers, portable computing devices, communication and/or media player devices, set-top devices, embedded systems, and other types of information handling machines. The term "processor" as used with reference to the processors $404_1$, $404_2$ ... $404_n$ encompasses any logical execution unit capable of executing program instructions, including but not limited to a packaged integrated circuit device (such as a microprocessor), a processing core within a packaged integrated circuit device (such as a microprocessor core), or a hardware thread comprising one or more functional units within a processing core (such as an SMT thread). The processors $404_1$, $404_2$ ... $404_n$ may be situated within a single computing device or node (e.g., as part of a single-node SMP system) or they may be distributed over plural nodes (e.g., as part of a NUMA system, a cluster, or a cloud). The memory 408 may comprise any type of non-transitory data storage medium capable of storing data in computer readable form for use in program execution, including but not limited to, any of various types of random access memory (RAM), various flavors of programmable read-only memory (PROM) (such as flash memory), and other types of primary storage (i.e., program memory). The cache memories $410_1$, $410_2$ ... $410_n$ may be implemented in several levels (e.g., as level 1, level 2 and level 3 caches) and the cache controllers $412_1$, $412_2$ ... $412_n$ may collectively represent the cache controller logic that supports each cache level. The memory controller 414 may reside separately from processors $404_1$, $404_2$ ... $404_n$, for example, as part of a discrete chipset. Alternatively, the memory controller 414 could be provided by plural memory controller instances that are respectively integrated with the processors $404_1$, $404_2$ ... $404_n$.

Each of the processors $404_1$, $404_2$ ... $404_n$ is operable to execute program instruction logic under the control of program instructions stored in the memory 408 (or elsewhere). As part of this program execution logic, update operations (updaters) 418 will periodically execute within a process, thread, or other execution context (hereinafter "task") on the processors $404_1$, $404_2$ ... $404_n$ to perform atomic data element move operations involving the shared data 416, as disclosed herein. Reference numerals $418_1$, $418_2$ ... $418_n$ illustrate individual updaters that may execute from time to time on the various processors $404_1$, $404_2$ ... $404_n$. Each of the processors $404_1$, $404_2$ ... $404_n$ also periodically executes read operations (readers) 420 with respect to the shared data 416. Reference numerals $420_1$, $420_2$ ... $420_n$ illustrate individual readers that may execute from time to time on the various processors $404_1$, $404_2$ ... $404_n$.

Figure 15:
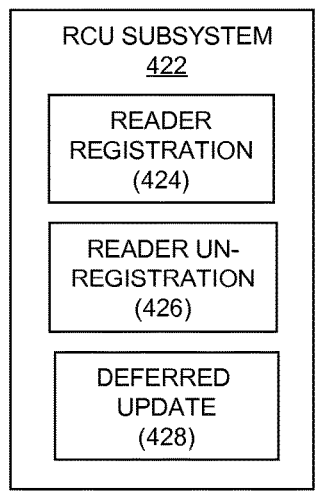
FIG. 15 is a functional block diagram of an RCU subsystem in the computer system of FIG. 14 that may be used by data readers and updaters to protect lockless readers that reference data elements being atomically moved.

To facilitate synchronized updater-reader access to the shared data 416, the several processors $404_1$, $404_2$ ... $404_n$ may be programmed to implement an RCU subsystem 422 by periodically executing respective RCU instances $422_1$, $422_2$ ... $422_n$ as part of their operating system functions or user-mode operations. As shown in FIG. 15, each of the read-copy update subsystem instances 422 may include a reader registration component 424, a reader un-registration component 426, and a deferred update component 428. The reader registration component 424 may be used by the readers 420 when they enter an RCU-protected critical section, such as the start of a search for a data element in a linked data structure. This component may be implemented using an RCU primitive such as rcu_read_lock( ). The reader un-registration component 426 may be used by the readers 420 when they leave an RCU-protected critical section, such as at the end of a search for a data element in a linked data structure. This component may be implemented using an RCU primitive such as rcu_read_unlock( ). The deferred update component 426 is used by the updaters 418 to initiate deferred operations following a grace period in each of the processors $404_1$, $404_2$ ... $404_n$ will have passed through a quiescent state. Examples of such deferred operations would be the deallocation operations involving data elements, existence structures and allegiance structure described above, including operations 12 and 14 of FIG. 1, and operations 212 and 214 of FIG. 7. The deferred update component 428 may be implemented using conventional RCU processing techniques. For example, it may be provided by a primitive such as call_rcu( ) or synchronize_rcu( ), the former utilizing asynchronous grace period detection and the latter utilizing synchronous grace period detection. As noted above, other deferred deallocation techniques providing other semantics may also be used.

Accordingly, a technique for atomically moving data elements between linked data structures has been disclosed. It will be appreciated that the foregoing concepts may be variously embodied in any of a data processing system, a machine implemented method, and a computer program product in which programming logic is provided by one or more computer-readable storage media for use in controlling a computing system to perform the required functions. Example embodiments of a machine-implemented method were previously described in connection with FIGS. 1-13. Example embodiments of a data processing system were previously described in connection with FIGS. 14-15.

With respect to a computer program product, digitally encoded program instructions may be stored on one or more computer-readable data storage media for use in controlling a computer or other information handling machine or device to perform the required functions. The program instructions may be embodied as machine language code that is ready for loading and execution by the machine apparatus, or the program instructions may comprise a higher level language that can be assembled, compiled or interpreted into machine language. Example languages include, but are not limited to C, C++, assembly, to name but a few. When implemented on a machine comprising a processor, the program instructions combine with the processor to provide a particular machine that operates analogously to specific logic circuits, which themselves could be used to implement the disclosed subject matter.

Figure 16:
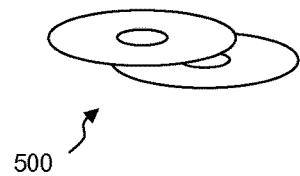
FIG. 16 is a diagrammatic illustration showing example media that may be used to provide a computer program product that enhances the operation of a computer system by providing the capability to atomically move a data element of a linked data structure without delaying lockless readers.

Example data storage media for storing such program instructions are shown by reference numerals 408 (memory) and 410 (cache) of the computer system 402 of FIG. 14. The computer system 402 may further include one or more secondary (or tertiary) storage devices (not shown) that could store the program instructions between system reboots. The computer system 402 could also store information on one or more remote servers (not shown), which would also include a computer readable storage medium for storing program instructions as described herein. A further example of a computer readable storage medium that may be used to store the program instructions would be portable optical storage disks of the type that are conventionally used for commercial software sales, such as compact disk-read only memory (CD-ROM) disks, compact disk-read/write (CD-R/W) disks, and digital versatile disks (DVDs). Examples of such media are shown by reference number 500 in FIG. 16.

The computer readable storage medium can thus be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program code described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program code from the network and forwards the computer readable program code for storage in a computer readable storage medium within the respective computing/processing device.

Computer readable program code for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). As previously mentioned, in some embodiments, electronic circuitry including, for example, programmable logic circuitry, field-programmable gate arrays (FPGA), or programmable logic arrays (PLA) may execute the computer readable program code by utilizing state information of the computer readable program code to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program code.

These computer readable program code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program code may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program code may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. A system, comprising:
   one or more processors;
   a memory coupled to said one or more processors, said memory including a computer usable medium storing at least one program of instructions executable by said processor to perform operations for atomically moving a data element of a linked data structure without delaying lockless readers that reference said data element without using locks, said operations comprising:
   allocating a status-indicating entity if one does not already exist and associating it with said data element in a manner that allows said status-indicating entity to be referenced from said data element by said lockless readers, said data element being linked to a first linked data structure that said lockless readers can traverse in order to reference said data element;

copying said data element, or a pointer thereto, to create a copy element that is to be linked to a second linked data structure;

associating said status-indicating entity with said copy element in a manner that allows said status-indicating entity to be referenced from said copy element by said lockless readers;

linking said copy element to said second linked data structure that said lockless readers can traverse in order to reference said copy element;

said status-indicating entity initially indicating to said lockless readers that said data element has validity with respect to said first linked data structure and said copy element has no validity with respect to said second linked data structure;

atomically updating said status-indicating entity to indicate to said lockless readers that said data element has no validity with respect to said first linked data structure and said copy element has validity with respect to said second linked data structure;

deleting said data element from said first linked data structure and deallocating it in a deferred manner that guarantees none of said lockless readers will be referencing said data element at the time of deallocation; and disassociating said status-indicating entity from said copy element, and if no longer needed, deallocating it in a deferred manner that guarantees none of said lockless readers will be referencing said status-indicating entity at the time of deallocation.

2. The system of claim 1, wherein said first linked data structure and said second linked data structure are different linked data structures or they are the same linked data structure, and wherein:

if said first linked data structure and said second linked data structure are different, said operations are performed without modifying said copy element such that the effect of said operations is to atomically move said data element between different linked data structures; and if said first linked data structure and said second linked data structure are the same, said operations includes modifying said copy element such that the effect of said operations is to atomically update said data element within the same linked data structure.

3. The system of claim 1, wherein said status-indicating entity comprises either (1) an existence group structure that indicates whether a data element exists in a linked data structure, or (2) an allegiance structure that indicates whether a data element has allegiance to a linked data structure.

4. The system of claim 3, wherein:

said status-indicating entity comprises said existence group structure, said existence group structure having an outgoing existence structure referenced by said data element and an incoming existence structure referenced by said copy element;

said outgoing existence structure initially indicating existence and said incoming existence structure initially indicating non-existence; and said atomic updating of said status-indicating entity comprises switching said existence group structure so that said outgoing existence structure indicates non-existence and said incoming existence structure indicates existence.

5. The system of claim 4, wherein switching said existence group structure comprises atomically updating an existence switch, and wherein:

said existence switch is referenced by said outgoing existence structure and said incoming existence structure;

said existence switch selectively references one of two or more existence arrays, said existence arrays comprising array elements that each store an existence indicator that indicates existence or non-existence;

said outgoing existence structure and said incoming existence structure each store an array offset value identifying an offset position in said existence arrays;

said existence switch is atomically updated to change its reference from a first one of said existence arrays to a second one of said existence arrays; and said first and second existence arrays store different existence indicators at their array offset positions, such that atomically updating said existence switch to change its reference between said first and second existence arrays results in a change in existence status of said data element and said copy element according to said array offset values stored in their respective outgoing existence structure and incoming existence structure.

6. The system of claim 3, wherein:

said status-indicating entity comprises said allegiance structure, said allegiance structure embodying an allegiance switch that selectively establishes allegiance to said first linked data structure and said second linked data structure;

said atomic updating of said status-indicating entity comprises atomically updating said allegiance switch to change its allegiance from said first linked data structure to said second linked data structure; and said allegiance switch being either directly or indirectly referenced by said data element and said copy element.

7. The system of claim 6, wherein:

said allegiance switch is indirectly referenced by said data element and said copy element via respective allegiance/offset structures that each store a pointer to said allegiance switch and store an array offset value;

said allegiance switch establishes allegiance to said first linked data structure and said second linked data structure by selectively referencing either (1) two or more allegiance status arrays or (2) two or more existence arrays;

said allegiance switch is atomically updated to either (1) change its reference from a first one of said allegiance status arrays to a second one of said allegiance status arrays or (2) change its reference from a first one of said existence arrays to a second one of said existence arrays;

said first and second allegiance status arrays store pointers at their array offset positions that respectively reference said first linked data structure and said second linked data structure, such that atomically updating said allegiance switch to change its reference between said first and second allegiance status arrays results in a change in allegiance of said data element and said copy element according to the array offset values stored in their respective allegiance/offset structures; and said first and second existence arrays store existence indicators at their array offset positions, such that atomically updating said allegiance switch to change its reference between said first and second existence arrays results in a change in allegiance of said data element and said copy element according to said array offset values stored in their respective allegiance/offset structures.

8. A computer program product, comprising:
one or more computer-readable storage media;
program instructions stored on said one or more storage media for programming a data processing platform having one or more processors operatively coupled to a memory to perform operations for atomically moving a data element of a linked data structure without delaying lockless readers that reference said data element without using locks, said operations comprising:
allocating a status-indicating entity if one does not already exist and associating it with said data element in a manner that allows said status-indicating entity to be referenced from said data element by said lockless readers, said data element being linked to a first linked data structure that said lockless readers can traverse in order to reference said data element;
copying said data element, or a pointer thereto, to create a copy element that is to be linked to a second linked data structure;
associating said status-indicating entity with said copy element in a manner that allows said status-indicating entity to be referenced from said copy element by said lockless readers;
linking said copy element to said second linked data structure that said lockless readers can traverse in order to reference said copy element;
said status-indicating entity initially indicating to said lockless readers that said data element has validity with respect to said first linked data structure and said copy element has no validity with respect to said second linked data structure;
atomically updating said status-indicating entity to indicate to said lockless readers that said data element has no validity with respect to said first linked data structure and said copy element has validity with respect to said second linked data structure;
deleting said data element from said first linked data structure and deallocating it in a deferred manner that guarantees none of said lockless readers will be referencing said data element at the time of deallocation; and
disassociating said status-indicating entity from said copy element, and if no longer needed, deallocating it in a deferred manner that guarantees none of said lockless readers will be referencing said status-indicating entity at the time of deallocation.

9. The computer program product of claim 8, wherein said first linked data structure and said second linked data structure are different linked data structures or they are the same linked data structure, and wherein:
if said first linked data structure and said second linked data structure are different, said operations are performed without modifying said copy element such that the effect of said operations is to atomically move said data element between different linked data structures; and
if said first linked data structure and said second linked data structure are the same, said operations includes modifying said copy element such that the effect of said operations is to atomically update said data element within the same linked data structure.

10. The computer program product of claim 8, wherein:
said status-indicating entity comprises an existence group structure that indicates whether a data element exists in a linked data structure;
said existence group structure having an outgoing existence structure referenced by said data element and an incoming existence structure referenced by said copy element;
said outgoing existence structure initially indicating existence and said incoming existence structure initially indicating non-existence; and
said atomic updating of said status-indicating entity comprises switching said existence group structure so that said outgoing existence structure indicates non-existence and said incoming existence structure indicates existence.

11. The computer program product of claim 10, wherein switching said existence group structure comprises atomically updating an existence switch, and wherein:
said existence switch is referenced by said outgoing existence structure and said incoming existence structure;
said existence switch selectively references one of two or more existence arrays, said existence arrays comprising array elements that each store an existence indicator that indicates existence or non-existence;
said outgoing existence structure and said incoming existence structure each store an array offset value identifying an offset position in said existence arrays;
said existence switch is atomically updated to change its reference from a first one of said existence arrays to a second one of said existence arrays; and
said first and second existence arrays store different existence indicators at their array offset positions, such that atomically updating said existence switch to change its reference between said first and second existence arrays results in a change in existence status of said data element and said copy element according to said array offset values stored in their respective outgoing existence structure and incoming existence structure.

12. The computer program product of claim 8, wherein:
said status-indicating entity comprises an allegiance structure that indicates whether a data element has allegiance to a linked data structure;
said allegiance structure embodying an allegiance switch that selectively establishes allegiance to said first linked data structure and said second linked data structure;
said atomic updating of said status-indicating entity comprises atomically updating said allegiance switch to change its allegiance from said first linked data structure to said second linked data structure; and
said allegiance switch being either directly or indirectly referenced by said data element and said copy element.

13. The computer program product of claim 12, wherein:
said allegiance switch is indirectly referenced by said data element and said copy element via respective allegiance/offset structures that each store a pointer to said allegiance switch and store an array offset value;
said allegiance switch establishes allegiance to said first linked data structure and said second linked data structure by selectively referencing either (1) two or more allegiance status arrays or (2) two or more existence arrays;
said allegiance switch is atomically updated to either (1) change its reference from a first one of said allegiance status arrays to a second one of said allegiance status arrays or (2) change its reference from a first one of said existence arrays to a second one of said existence arrays;

said first and second allegiance status arrays store pointers at their array offset positions that reference said allegiance/offset structures of said first linked data structure and said second linked data structure, such that atomically updating said allegiance switch to change its reference between said first and second allegiance status arrays results in a change in allegiance of said data element and said copy element according to the array offset values stored in their respective allegiance/offset structures; and said first and second existence arrays store existence indicators at their array offset positions, such that atomically updating said allegiance switch to change its reference between said first and second existence arrays results in a change in allegiance of said data element and said copy element according to said array offset values stored in their respective allegiance/offset structures.

* * * * *